United States Patent [19]

MacGregor et al.

[11] Patent Number: 5,396,621
[45] Date of Patent: Mar. 7, 1995

[54] SORTING A TABLE BY ROWS OR COLUMNS IN RESPONSE TO INTERACTIVE PROMPTING WITH A DIALOG BOX GRAPHICAL ICON

[75] Inventors: Kathryn MacGregor, Palo Alto; Elisabeth A. Waymire, San Carlos, both of Calif.

[73] Assignee: Claris Corporation, Santa Clara, Calif.

[21] Appl. No.: 698,293

[22] Filed: May 10, 1991

[51] Int. Cl.⁶ .................... G06F 15/40; G06F 3/03
[52] U.S. Cl. ................................ 395/161; 395/600;
364/DIG. 1; 364/237.2; 364/222.81;
364/222.9; 364/225.1; 364/283.3
[58] Field of Search .................. 364/300, 408, 900;
395/600, 161

[56] References Cited

U.S. PATENT DOCUMENTS

| | | | |
|---|---|---|---|
| 4,648,062 | 3/1987 | Johnson et al. | 364/900 |
| 4,739,477 | 4/1988 | Barker et al. | 364/300 |
| 4,989,141 | 1/1991 | Lyons et al. | 364/408 |

OTHER PUBLICATIONS

Person, et al, Using Excel: IBM Version, Que Corp., 1988, pp. 494–501.
Krumm, R. Understanding and Using Microsoft Excel, Simon & Shuster, Inc., 1989, Table of contents and pp. 104–120, 325–329 and 396–397.
Quattro Pro User's Guide, Borland International, Inc., 1987, 1989, Table of contents (pp. i–viii) and pp. 127–134 and 335–336.

*Primary Examiner*—Paul V. Kulik
*Assistant Examiner*—Wayne Amsbury
*Attorney, Agent, or Firm*—Blakely, Sokoloff, Taylor & Zafman

[57] ABSTRACT

An improved apparatus and method for sorting of information in a computerized spreadsheet or the like. The improved system provides for display of a graphical indication in the form of an icon indicative of the sort type, either by rows or by columns, which the data will be sorted in when a sort operation is performed.

12 Claims, 26 Drawing Sheets

SORTING A TABLE BY ROWS OR COLUMNS IN RESPONSE TO INTERACTIVE PROMPTING WITH A DIALOG BOX GRAPHICAL ICON

BACKGROUND OF THE INVENTION

1. Field of the Invention

The present invention relates to the field of human-machine interfaces for computer systems and, more specifically, to the field of human-machine interfaces for spreadsheet programs capable of being executed on such systems. The present invention further relates to spreadsheet programs having increased operational flexibility and increased functionality.

2. Description of the Related Art

The computer has revolutionized the office, home and, in fact, most every aspect of life in a modem society. One factor which has led to this revolution is the design of computer systems which are easier for a novice user to understand and to use. There have been many advances in the usability of computer programs and, although many of these may at first blush appear to be relatively insignificant, it is often the advances which at first appear to be so insignificant which have the greatest impact on the usability of computer systems. In fact, often the advances which go unnoticed by the user or which appear to implement a system "the way it naturally should be implemented" are the advances which are the most significant. However, even though some of these advances may appear to be insignificant, they are nonetheless non-trivial and often require significant skill, resources and ingenuity.

One type of computer application which has proven to be extremely useful is the computerized spreadsheet. The computerized spreadsheet may be thought of as just that; an accountant's type spreadsheet which has been implemented to run on a computer system allowing a user to enter numeric and other information in a columnar format. In such a computerized spreadsheet the user may designate certain "cells" or locations in the spreadsheet as being automatically calculated by the computer based on a formula provided by the user—often the calculation is based on data present in other cells. A number of such computerized spreadsheets are well known in the art and it is not necessary to provide significant further teaching of such known computer programs here except possibly to mention several examples of commercially available computerized spreadsheet products which include EXCEL ™ available from Microsoft Corporation of Bellevue, Wash. and 1-2-3 ™ available from Lotus Development Corporation of Cambridge, Mass. One other spreadsheet, perhaps not as well known as EXCEL and 1-2-3 is WINGZ ™ which is available from Informix, Inc. of Menlo Park, Calif. WINGZ is especially worth mention here as portions of the work of the preferred embodiment of the present invention are based on the WINGZ spreadsheet.

It will be useful to briefly discuss addressing of cells in a typical computerized spreadsheet. Typically, a cell is addressed based on the intersection of rows and columns at which the particular cell is located. Rows may be referred to sequential numbers (e.g., 1, 2, 3, 4 . . . ) and columns may be referred to by sequential letters (e.g., A, B, C, D . . . ). Therefore, a cell may be addressed by the concatenation of column letter and the row number (e.g., A1 for the cell occurring at the intersection of column A and row 1; D10 for the cell occurring at the intersection of column D and row 10). Cells may also be addressed as a range of cells (e.g., A1 . . . A5 for the range of cells A1,A2,A3,A4, and A5;A2 . . . C2 for the range of cells A2,B2 and C2).

Many known spreadsheets include capability to create a set of commands and store those commands in some storage location for later playback and execution. Such feature is variously known as "Procedures", "Macros", "Scripts", "Learn mode", etc. This type of feature will be referred to herein as a "programming language" or "learn mode". The feature is often termed learn mode because the feature may, in some systems, be turned on at some point during use of the program and then used to "learn" or record keystroke sequences input by the user. The user may then replay that set of keystroke sequences and, in some systems may edit the learned set of keystroke prior to playback. Unfortunately, during learn mode specific cell addresses or ranges of addresses may be recorded. During later playback the data at those specific cell addresses may have been moved to other locations in the spreadsheet and the result of the later playback may be that operations are performed on data which is not the desired data and, conversely, operation may not be performed on data which is the desired data.

At least one known computerized spreadsheet, EXCEL, provides capability to name a cell or range of cells with a name (such as EXPENSES for a range of cells containing expense information). When referring to named cells or ranges of cells, the user may then refer to such cells either with a cell name (e.g., EXPENSES) or a cell address (e.g., B3 . . . B5).

However, even in this known system, it is not understood to allow use of cell names in a programming language and, in fact, it is understood that cell names are typically used to refer to absolute cell locations. Therefore, even if used in a programming language the reference would not be properly updated when, for example, a new row is inserted and the cell address is changed as a result.

It is therefore an object of the present invention to provide for ability to utilize cell names in programming languages for use with spreadsheet applications. It is further an object of the present invention to provide for use of cells names to refer to relative as opposed to absolute addresses.

It is an important feature of spreadsheets that dam may be manipulated, such as for example by sorting the data. However, in some way the user must indicate the particular data which is to be sorted and, as the data is stored in a row and column format, a sort order (either by row or by column) must be indicated. Now, it is known in the art to provide for indicating whether data is to be sorted by rows or by columns. For example, EXCEL provides a dialog box which allows for designating whether the sort is to be performed by sorting rows or by sorting columns. Unfortunately, to many users of such computerized spreadsheets the expected result is not obvious when the sort order is designated in a dialog box by merely selecting the sort as being by rows or by columns.

Therefore, as another object of the present invention, it is desired to provide an apparatus and method which more readily indicates to the user of the computer system the order in which information will be sorted. It is further an object of the present invention to provide for a graphical indication of the selected sort type.

It is also known to provide for display of the dam entered in a columnar spreadsheet in a graphical mode such as by display of bar charts, line chart, pie chart, step chart, layer chart, or other type of chart. However, known computerized spreadsheets will typically display such graphical information in a format which covers up the columnar data associated with the graphical chart. For example, in many known spreadsheet applications, the graphical information is displayed on substantially the full display of the computer system coveting up all or substantially all of the columnar data.

It is an object of the present invention to provide for display of graphical data representative of columnar data in a manner which allows for simultaneous display of both the graphical data and the columnar data.

These and other objects of the present invention will be better understood with reference to the Detailed Description of the Preferred Embodiment, the accompanying drawings, and the claims.

SUMMARY OF THE INVENTION

An improved computerized spreadsheet is described. The present invention discloses an improved method and apparatus for allowing repeated execution of a command or set of commands in a spreadsheet program by storing the command or set of commands in a memory, such as a disk drive or RAM memory, and later retrieving and executing the command or set of commands, where at least one of the commands addresses a cell in the spreadsheet. In the improved method, the spreadsheet program provides capability to associate a logical name with the absolute address location of the cell and the command may utilize the logical name to address the cell. In this way, the absolute or relative address of the cell may be changed without effecting execution of the command or set of commands.

Further, the present invention provides for sorting of rows or columns of information in a spreadsheet. The user of the system may select the desired type of sort, i.e., either by row or by column. However, often the user may be unclear as to which type of sort should be used based merely on the title "Sort by Row" or "Sort by Column". Therefore, as one feature of the present invention, the present invention provides for displaying to the user a graphical indication of the sort type, i.e., row or column sort. In the preferred embodiment, the graphical indication is provided as grid including, in the case of a sort by row, an indicator such as an arrow coupling a first row of the grid with a second row of the grid and in the case of a sort by column, an indicator coupling a first column of the grid with a second column of the grid.

Finally, the present invention provides, in a computerized spreadsheet program, for improved placement of graphical information, such as a bar chart, line chart, pie chart, step chart or layer chart, on a display terminal or similar device wherein the graphical information is representative of a set of data contained in the spreadsheet and wherein the graphical information is displayed on the display terminal so as to avoid covering up, overlapping or obscuring the set of data.

These and other aspects of the present invention will be apparent to one of ordinary skill in the art with further reference to the below Detailed Description of the Preferred Embodiment and the accompanying drawings.

Figure 1:
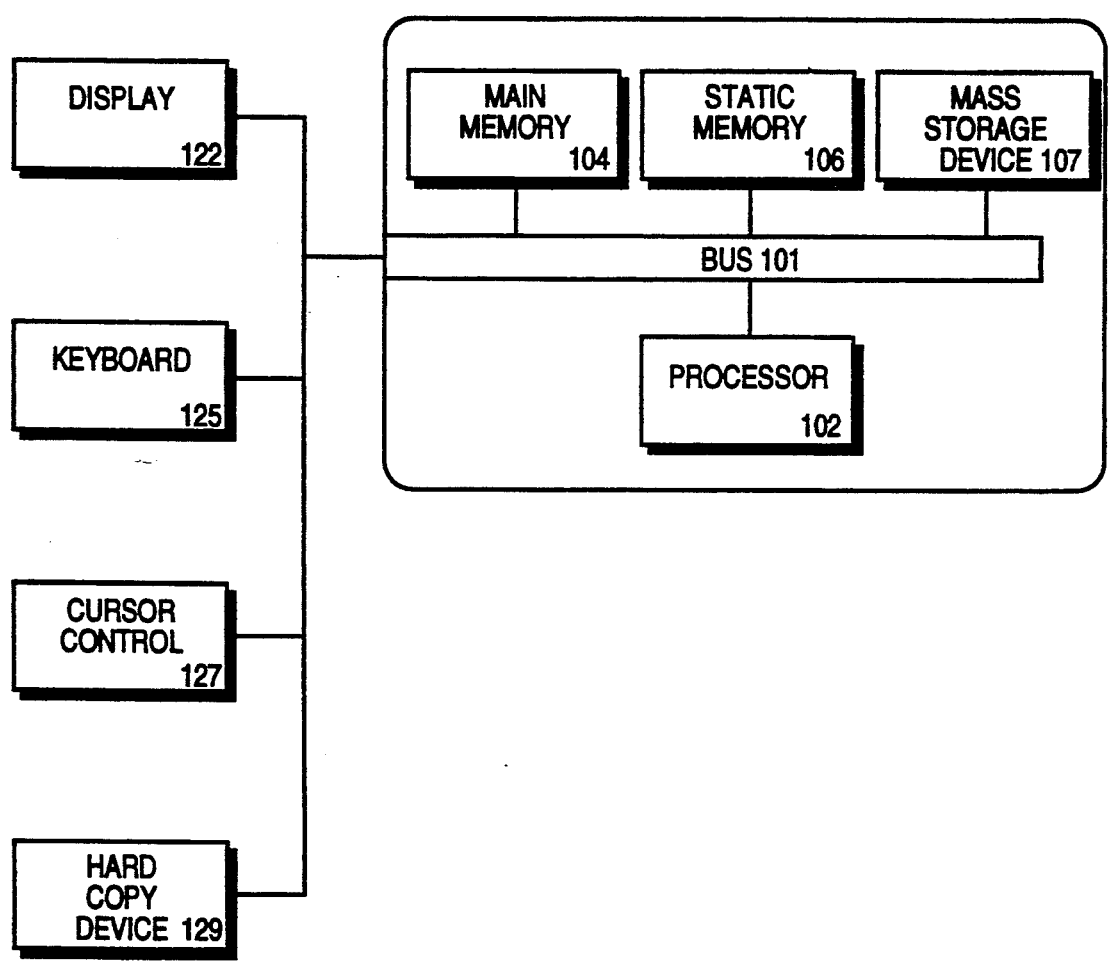
FIG. 1 is a block diagram of a computer system as may be utilized by the present invention.
Figure 3:
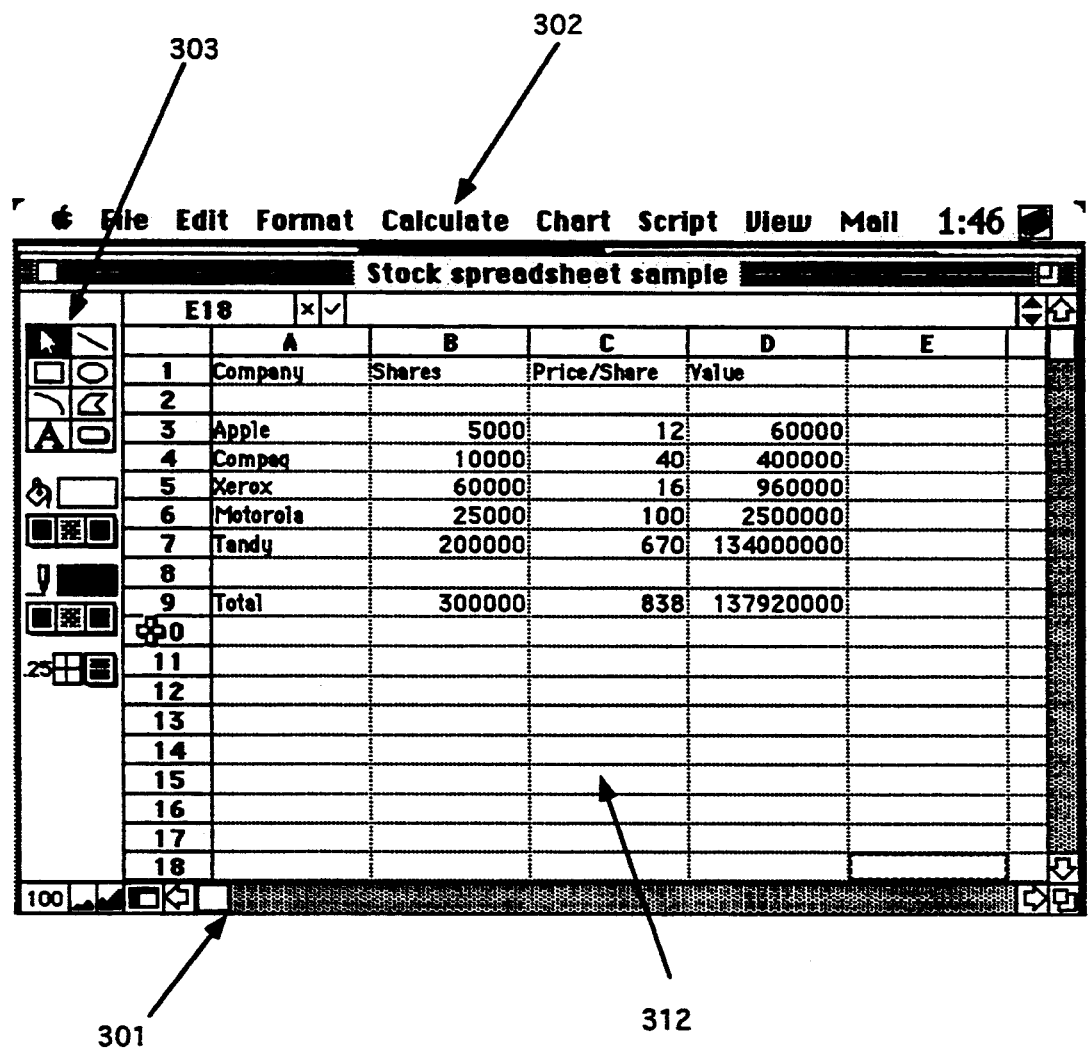
FIG. 3 is an illustration of a display screen showing an exemplary spreadsheet as may be utilized by the system of the preferred embodiment.

For ease of reference, it might be pointed out that reference numerals in all of the accompanying drawings typically are in the form "drawing number" followed by two digits, xx; for example, reference numerals on FIG. 1 may be numbered 1xx; on FIG. 3, reference numerals may be numbered 3xx. In certain cases, a reference numeral may be introduced on one drawing, e.g., reference numeral 301, and the same reference numeral may be utilized on other drawings to refer to the same item.

DETAILED DESCRIPTION OF THE PREFERRED EMBODIMENT

An improved computerized spreadsheet is described. In the following description, numerous specific details are set forth in order to provide a thorough understanding of the present invention. It will be obvious, however, to one skilled in the art that the present invention may be practiced without these specific details. In other instances, well-known circuits, structures and techniques have not been shown in detail in order not to unnecessarily obscure the present invention.

OVERVIEW OF THE PRESENT INVENTION

The present invention is implemented as a computerized spreadsheet of the type which has become well-known in the computer software industry. In essence, a computerized spreadsheet provides, on the display of a computer, a spreadsheet which may look similar to paper spreadsheets utilized by accounts and others for years. Of course, by implementing a spreadsheet as an application program running on a computer system, numerous advantages are gained over the paper counterpart. For example, changes may be easily made to any particular "cell" on the spreadsheet and the effect of those changes may be relatively automatically and immediately applied to other cells in the spreadsheet.

Another significant advantage is the ability to provide for display and printing of graphical information about the data entered on the spreadsheet. For example, bar charts, line graphs, and other visual representations of the data may be presented.

Spreadsheet programs have been implemented on personal computers as well as larger, multi-user computers. Although the present invention may be implemented on either of these types of computers, in its preferred embodiment, it has been implemented on a personal computer, namely, on the Macintosh ® family of computers available from Apple Computer, Inc. of Cupertino, Calif. Of course, it will be obvious to one of ordinary skill in the art that the present invention may be implemented on other personal computer systems, work stations, or multi-user computer systems without departure from the spirit and scope of the present invention. Before continuing with a description of the methods of operating the system of the preferred embodiment, it may be useful to provide an overall description of a computer system such as may be utilized by the present invention.

The computer system of preferred embodiment is described with reference to FIG. 1. A computer system as may be utilized by the preferred embodiment generally comprises a bus or other communication means 101 for communicating information, a processing means 102 coupled with said bus 101 for processing information, a random access memory (RAM) or other dynamic storage device 104 (commonly referred to as a main memory) coupled with said bus 101 for storing information and instructions for said processor 102, a read only memory (ROM) or other static storage device 106 coupled with said bus 101 for storing static information and instructions for said processor 102, a data storage device 107, such as a magnetic disk and disk drive, coupled with said bus 100 for storing information and instructions, a display device 122, such as a cathode ray tube, liquid crystal display, etc, coupled to said bus 101 for displaying information to the computer user, an alphanumeric input device 125 including alphanumeric and other keys coupled to said bus 101 for communicating information and command selections to said processor 102, and a cursor control device 127, such as a mouse, track ball, cursor control keys, etc, coupled to said bus 101 for communicating information and command selections to said processor 102 and for controlling cursor movement. Finally, it is useful of the system includes a hardcopy device 129, such as a printer, for providing permanent copies of information. The hardcopy device 129 is coupled with the processor 102, main memory 104, static memory 106 and mass storage device 107 through bus 101.

DESCRIPTION OF THE SYSTEM OF THE PREFERRED EMBODIMENT

In its preferred embodiment, the system of the present invention provides for display of graphical information in a spreadsheet application. Of course, certain features of the present invention may have application outside of display of graphical information and, in fact, certain features may very well be utilized in other types of computer programs. For example, certain features relating to a "learn feature" of the system of the preferred embodiment will be described below. Although these features are described with reference to their application for "learning" to son information from a spreadsheet, it should be understood that such features may have equal application in "learning" other techniques. In addition, techniques for displaying graphical data so as not to obscure or cover other, related or important data is disclosed. These techniques may very well have application in other types of computer programs. There are, of course, other applications of the techniques of the present invention which will not be described in detail herein as it the primary purpose of this detailed description to illustrate the preferred embodiment of the present invention with the understanding the invention itself is defined as recited by the claims.

Figure 2:
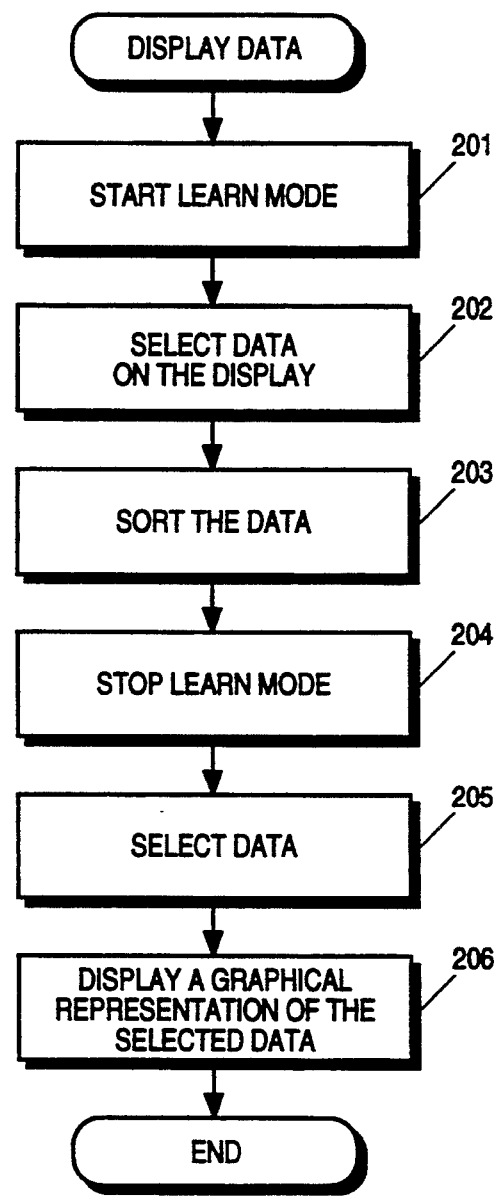
FIG. 2 is a flow diagram illustrating an overall process flow as may be practiced by the present invention.

Having stated the above, it is now time to turn to a detailed description of the preferred embodiment of the present invention. FIG. 2 is a flow diagram illustrating an overall process of the system of the present invention. Of course, many alternatives are available to the described overall process. For example, the described overall process discusses use of a "learn mode"; however, in the preferred embodiment it is not necessary to enter learn mode prior to displaying dam. However, it is felt that the described overall process will assist in an understanding of various aspects of the present invention. Each of the steps described with reference to FIG. 2 will be described in greater detail below and FIG. 2 is provided as an overview.

As illustrated, a process for displaying data in the system of the preferred embodiment may comprise the steps of fast starting a "learn mode", block 201. Through use of the "learn mode", a user of the system of the preferred embodiment may perform a sequence of steps (such as the described steps of selecting data, block 202; sorting data, block 203; and then stopping the learn mode, block 204) and the system will "learn" those steps so that they may be repeated at a later time through use of a shortened set of key strokes (such as by depressing a function key or depressing a combination of a control key and another key or, as preferably implemented by selecting to execute the command sequence through use of pull-down menus). It is important to understand that while computer applications in the prior art have utilized "learn modes", such systems have suffered from various deficiencies now overcome by the present invention. As one feature of the present invention, the present invention provides for naming of "objects" utilized during the learn process as opposed to numbering or otherwise addressing of such objects in prior art systems. The present invention further provides for using these logical names in as operands in the commands. It will be understood that this feature provides for significant advantages over systems of the prior art. Before moving on, it is worthwhile noting that the present invention provides for creation of executable modules through use of the learn mode feature. However, in addition, the present invention provides that such executable modules may also be created by typing or otherwise entering a command or set of commands in the file. However created, the present invention provides for use of logical names as an operand in commands in these executable modules.

After selecting the learn mode, data to be sorted and displayed in a graphical format is selected, block 202. The data is then sorted, block 203. As will be appreciated with reference to the below description of the son feature of the present invention, the data may be selectively sorted either by rows or by columns (the ability to select whether to son by rows or by columns will be referred to herein as selecting the "son type"). Importantly, the present invention provides for a graphical indication to the user illustrating the selected sort type. This will be described in greater detail below.

The user may then wish to display graphical information such as a bar chart, line chart, pie chart, step chart or layer chart representative of certain of the displayed data. Of course, it is not necessary to have first sorted the data before displaying the graphical information and the invention is discussed in order of first having sorted the data only as a matter of convenience. In any event, in order to proceed with displaying the graphical information, first data is selected, block 205. The data may be selected in one of a number of ways—for example, by highlighting the desired data using the cursor control device 127. The data may also be selected by specifying a range of addresses of cells, or by specifying a logical name for a range of addresses of cells. (Block 202 also required selecting data, such selection may have been carded out in any of the manners just described.)

Finally, the graphical information showing the selected data is displayed on the display, block 206. One important feature of the present invention is the ability of the system to position the graphical information, when possible, so as not to obscure or hide the cells containing the selected dam. This feature will be discussed in greater detail below.

Turning briefly to FIG. 3, a sample spread sheet 301 is illustrated. As can be seen the sample spreadsheet consists of a plurality of rows (shown numbered 1–18) and a plurality of columns (shown identified with letters A–E). The spreadsheet program of the preferred embodiment is designed to execute on a Macintosh computer and, as such, has a general appearance which will be familiar to users of Macintosh computer systems. As one features of this familiar interface, a menu bar 302 is provided at the top of the display. The menu bar of the spreadsheet program of the preferred embodiment includes seven functions which relate to the spreadsheet program (an eighth function MAIL is listed and relates to another application program executing on the particular Macintosh computer). The seven functions are FILE, EDIT, FORMAT, CALCULATE, CHART, SCRIPT, and VIEW. Of course, the particular rifles chosen for these functions may be changed from embodiment to embodiment and, in fact, in certain embodiment such as implementations on other than Macintosh computers or in implementations not following Macintosh interface conventions, the menu bar may not appear at all. In any event, several of these functions will be discussed in greater detail below. Use of a cursor control device 127 to select a particular function and to then select menu items from a menu displayed as a result of selection of the particular function is well known to one of ordinary skill in the an and will not be discussed here in greater detail.

The spreadsheet program further provides for certain other functions which may be selected in area 303. Although many of these other functions will be understood by a person having experience in use of Macintosh computers, such an understanding is not necessary to appreciate the present invention and, therefore, these functions will not be discussed in greater detail here.

Now, taming back to what will be referred to as the spreadsheet itself (which is the area including intersecting rows 1–18 and columns A–E), the spreadsheet comprises a plurality of "cells", such as cell 312 which occurs at the intersection of row 15 and column B. The term cell is well-known and will be understood by persons familiar with computerized spreadsheet programs. Typically, cells may be addressed by referring to the column letter and row number in which they occur—thus, cell 312 may be addressed as B15. Again, this type of addressing scheme is well-known and it is not felt that further description of basic spreadsheet addressing concepts is necessary here.

Data has been entered for purposes of illustrating concepts of the present invention in the spreadsheet. As can be seen, the dam is entered in the rows and columns of the spreadsheet and this format will be referred to herein as a columnar format. In row 1, column titles have been entered including "Company", "Shares", "Price/Share" and "Value" where "Company" is meant to represent a company name, "Shares" is meant to represent the number of shares of stock of the company owned, "Price/Share" is meant to represent the price per share of that company's stock, and "Value" is computed by multiplying "Shares" by "Price/Share" yielding the total value of that holding. (Of course, all of the data is merely exemplary and no effort has been made to have the data correspond to any actual stock market data.)

It is now appropriate to discuss the above-mentioned steps in greater detail.

ENTERING LEARN MODE

As has been mentioned, the present invention allows for creation of "executable modules" or "scripts" which comprise one or more commands which may be executed by the computer system of the present invention. These commands often include an operator portion which specifies an operation to take place and an address portion which specifies a cell or set of cells upon which the operation is to act.

Figure 4A:
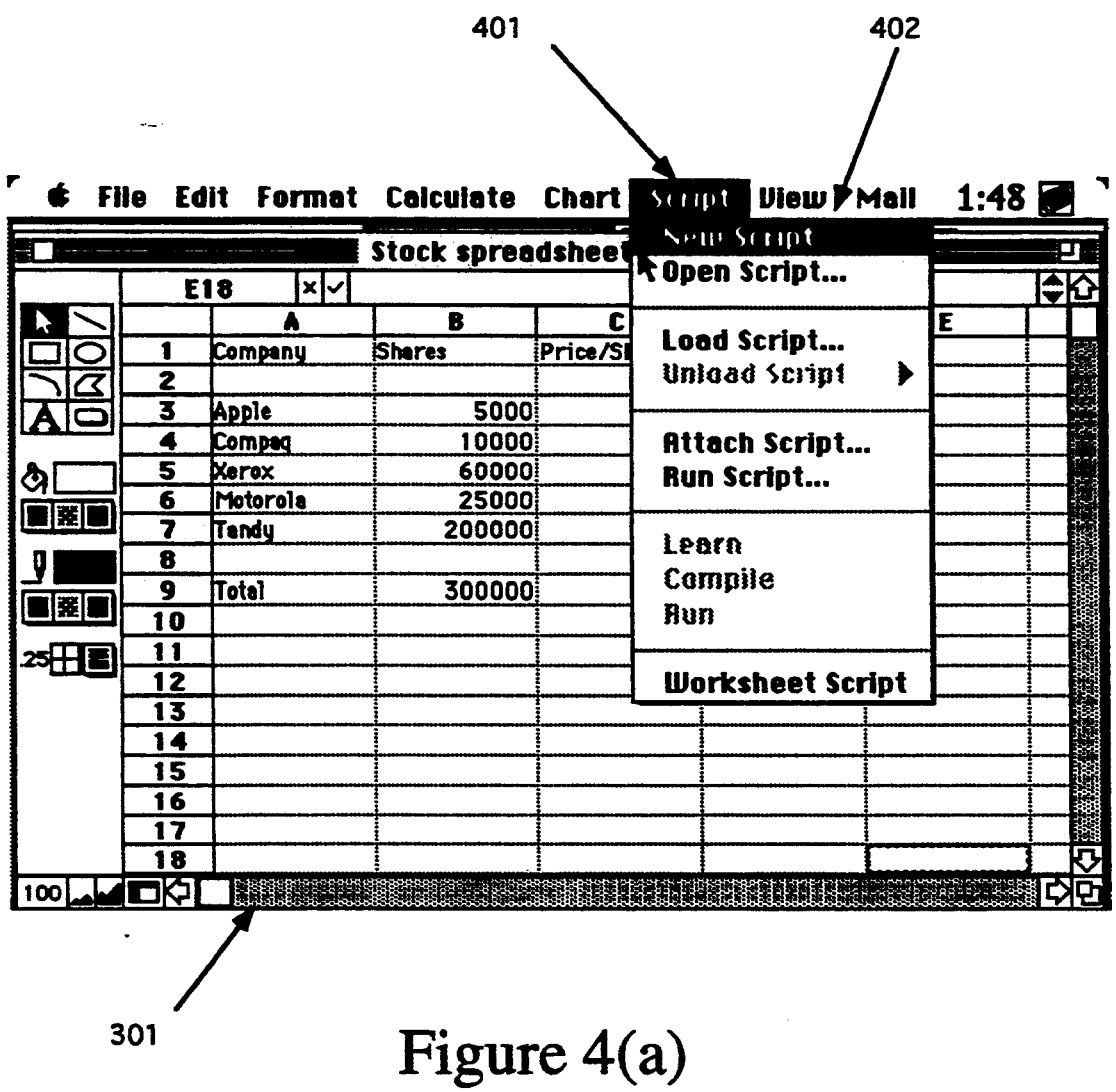
FIG. 4(a) through FIG. 4(d) are illustrations of a display screen showing a process for creating a script in learn mode as may be utilized by the system of the preferred embodiment.
Figure 4B:
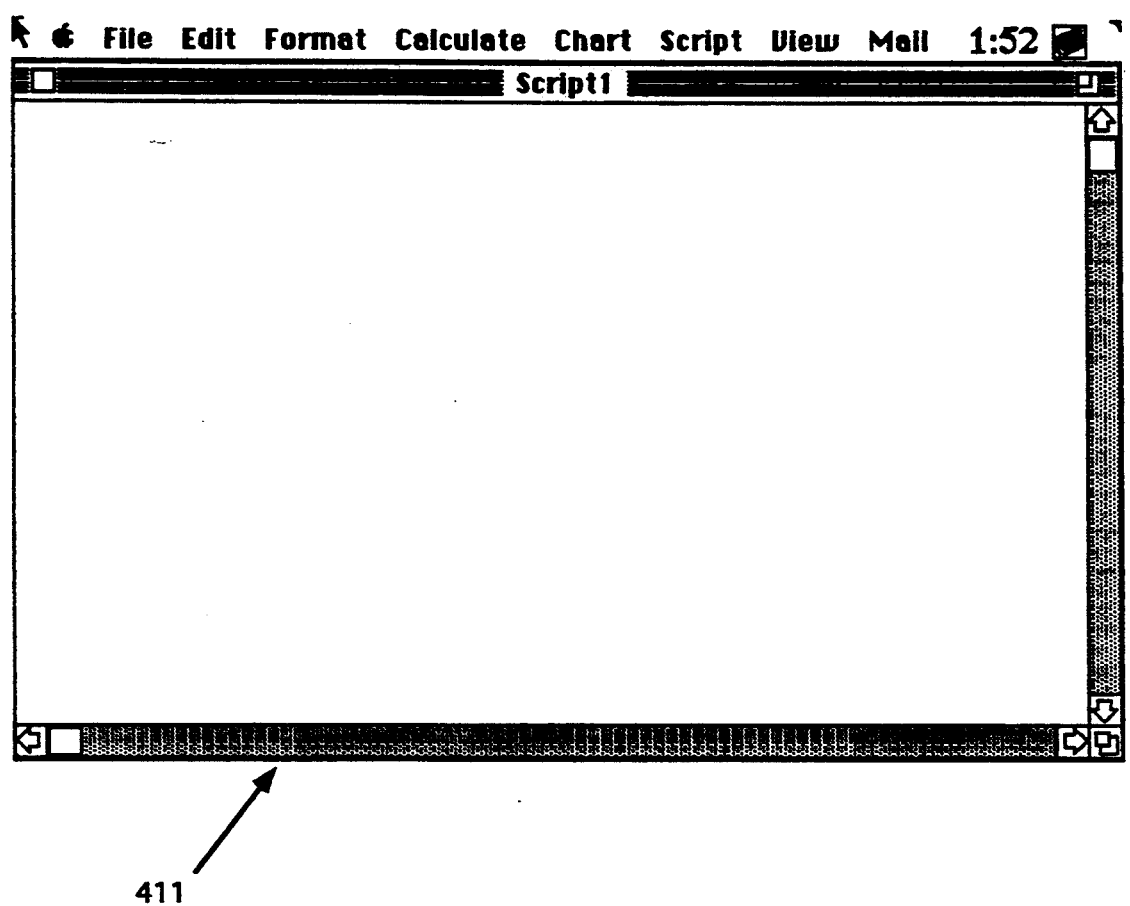
Figure 4C:
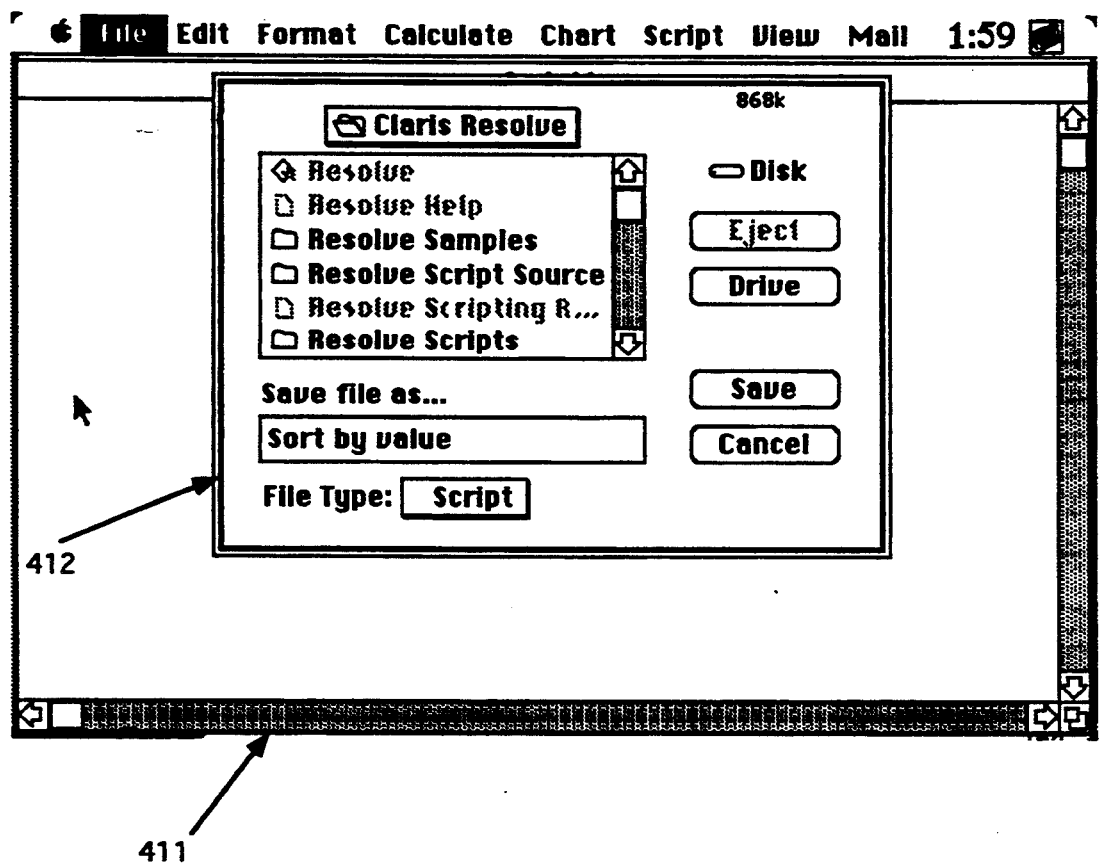

In the preferred embodiment of the present invention, scripts are created as fries which may be stored on a mass storage device 107 by selecting the script function 401 from the menu bar 302 and then selecting "New Script" 402 (as shown by FIG. 4(a)). Selecting "New Script" 402 causes the computer system to display a screen such as the screen 411 shown in FIG. 4(b). The file is initially created and named with a temporary name such a "Script1"; however, when the file is first saved to the mass storage device 107, a new name may be selected by the user using a dialog box 412 as illustrated by FIG. 4(c). This process of creating a file with a temporary name and then providing a new name to the file when the file is initially saved will be well-known to users of Macintosh computers. In the present illustration, the file is saved with the name "Son by value" indicating the script will be used to son entries in the spreadsheet by the value of the stock holding.

Commands may be input to the script file in the preferred embodiment in one of two ways. First, the commands may be simply typed or otherwise manually entered into the file. This method will not be discussed in greater detail herein—however, it is important to note that regardless of the method used, the concepts of the present invention are equally applicable.

The second method provides for the system of the present invention to "learn" from a set of keystrokes and actions subsequently made by the user of the system. This method offers the significant advantage over the first method of requiring significantly less knowledge on the pan of the user of the spreadsheets commands and command formats. It might be noted that after having initially created a script using this method, the user may then proceed to manually edit the script and, thus, the two methods are mutually compatible and usable. In the end, what is important is that an "executable module" or "script" is created.

Figure 4D:
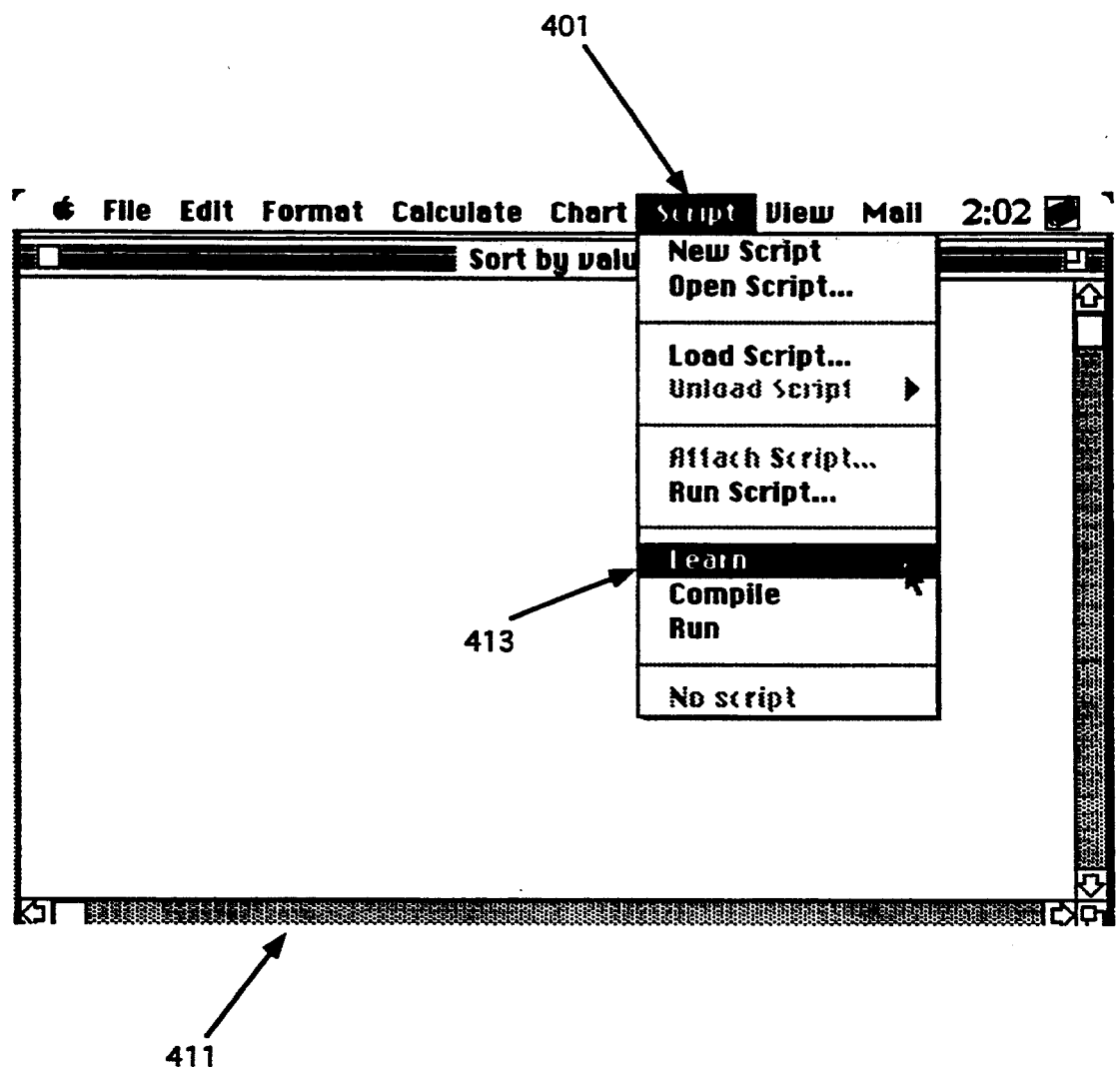

FIG. 4(d) illustrates entering learn mode. Again, the user selects the script function 401 from the menu bar 302 and then selects "Learn" 413. When in "learn mode", anytime the script function 401 is again selected, a check mark will appear next to the word "Learn" 413 in the Script menu indicating the program is in learn mode. While in learn mode, keystrokes and other actions are recorded to the currently active script file—in the present example, the file named "Sort by Value" —in the form of appropriate commands executable by the program of the preferred embodiment. The user may exit "learn mode" by selecting script 401 and again selecting "Learn" 413. Examples of script files may be found with reference to FIGS. 7(a) and 7(b) which figures will be discussed in greater detail below.

NAME RANGES

In the system of the present invention, cells may be addressed in the well-known manner discussed above of referring to rows and columns in which the cells occur. In addition, the present invention provides for allowing logical names to be associated with row/column addresses.

Figure 5A:
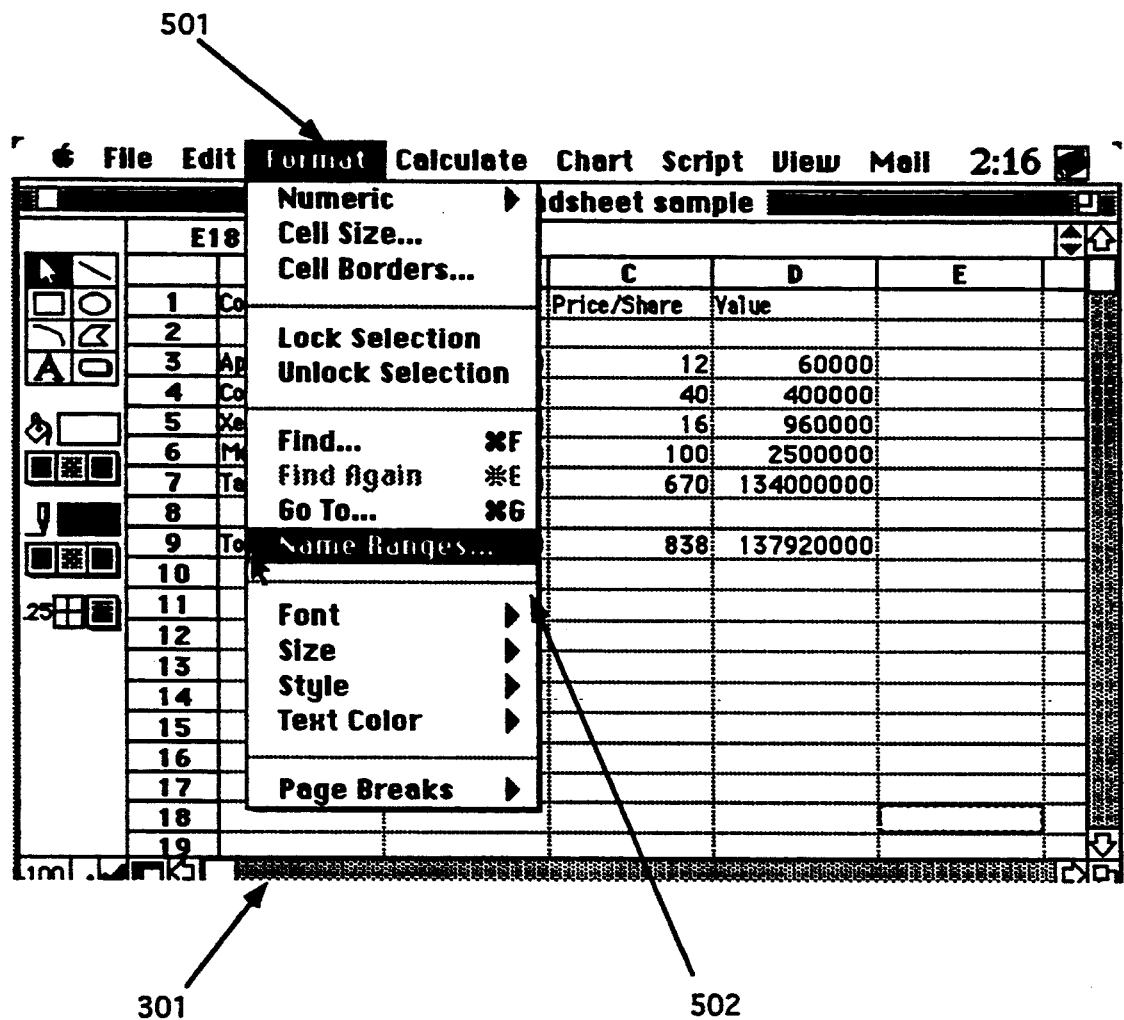
FIG. 5(a) through FIG. 5(f) are illustrations of a display screen showing a process for naming objects such as cell as may be utilized by the system of the preferred embodiment.
Figure 5B:
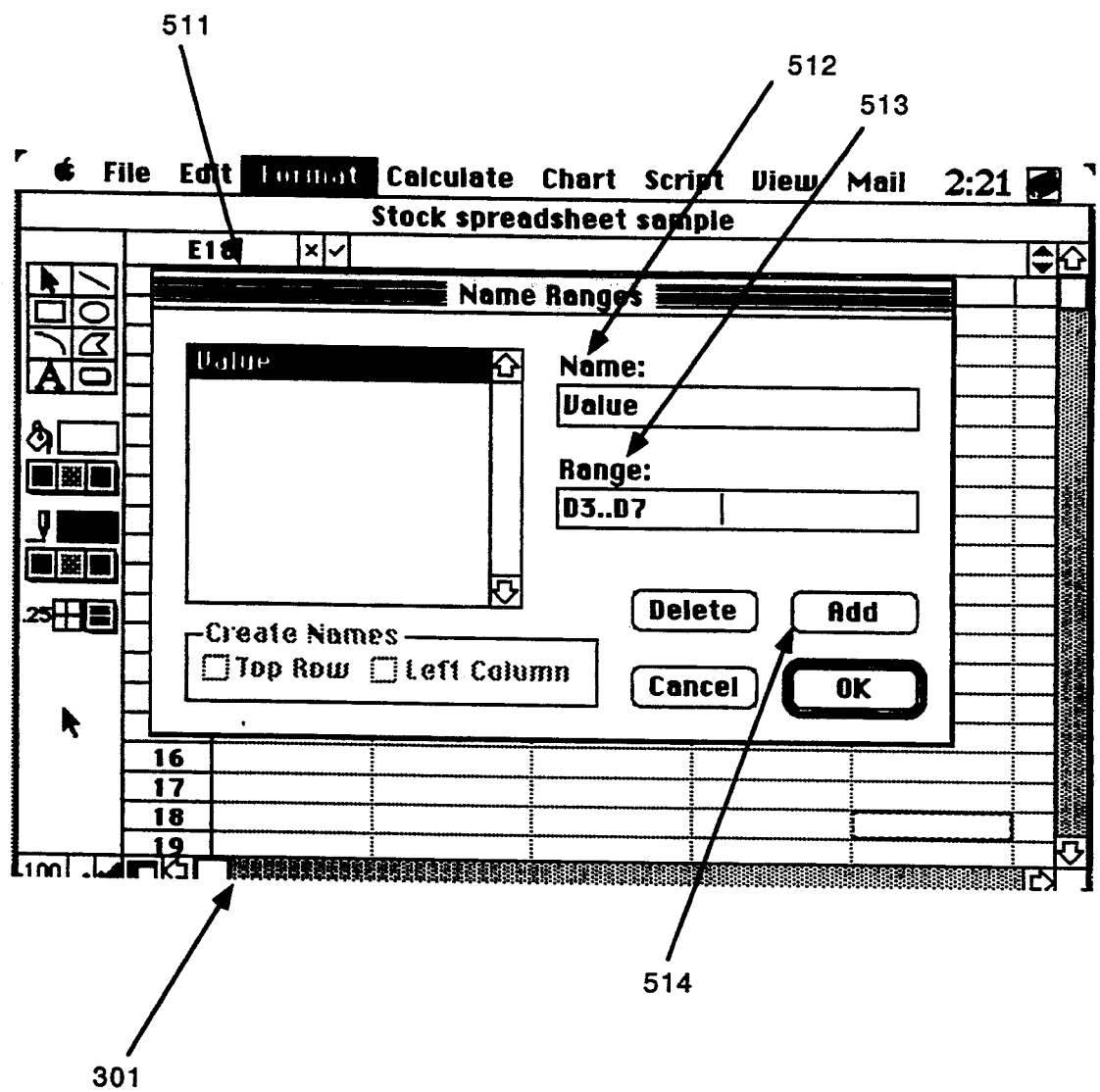

FIG. 5(a) illustrates the "Format" menu which is displayed as a result of selecting the "Format" function 501. The format function includes a menu item "Name Ranges . . . " 502 which is used to name cells or ranges of cells with a logical name. FIG. 5(b) illustrates a dialog box 511 which is displayed as a result of selecting "Name Ranges . . . " 502. The dialog box 511 allows the user to specify a logical name in the box labeled "Name" 512 and to specify the set or range of cells to be associated with the logical name in the box labeled "Range" 513. The set or range of cells is specified by specifying the row and column information as previously discussed. This row/column address information is referred to herein as an absolute address and may also be referred to as a relative address. (It might be noted that certain commercial spreadsheet products provide for both an absolute addressing mode and a relative addressing mode; however, and without discussing in great detail the differences between these two modes, it is noted that both of these nodes provide for addressing with row and column information.) After having specified the logical name and range, the add button 514 is selected and data representative of the association between the specified logical name and the specified address is stored on the mass storage device 107 or in the main memory 104 (for later storage in the mass storage device 107).

Figure 5C:
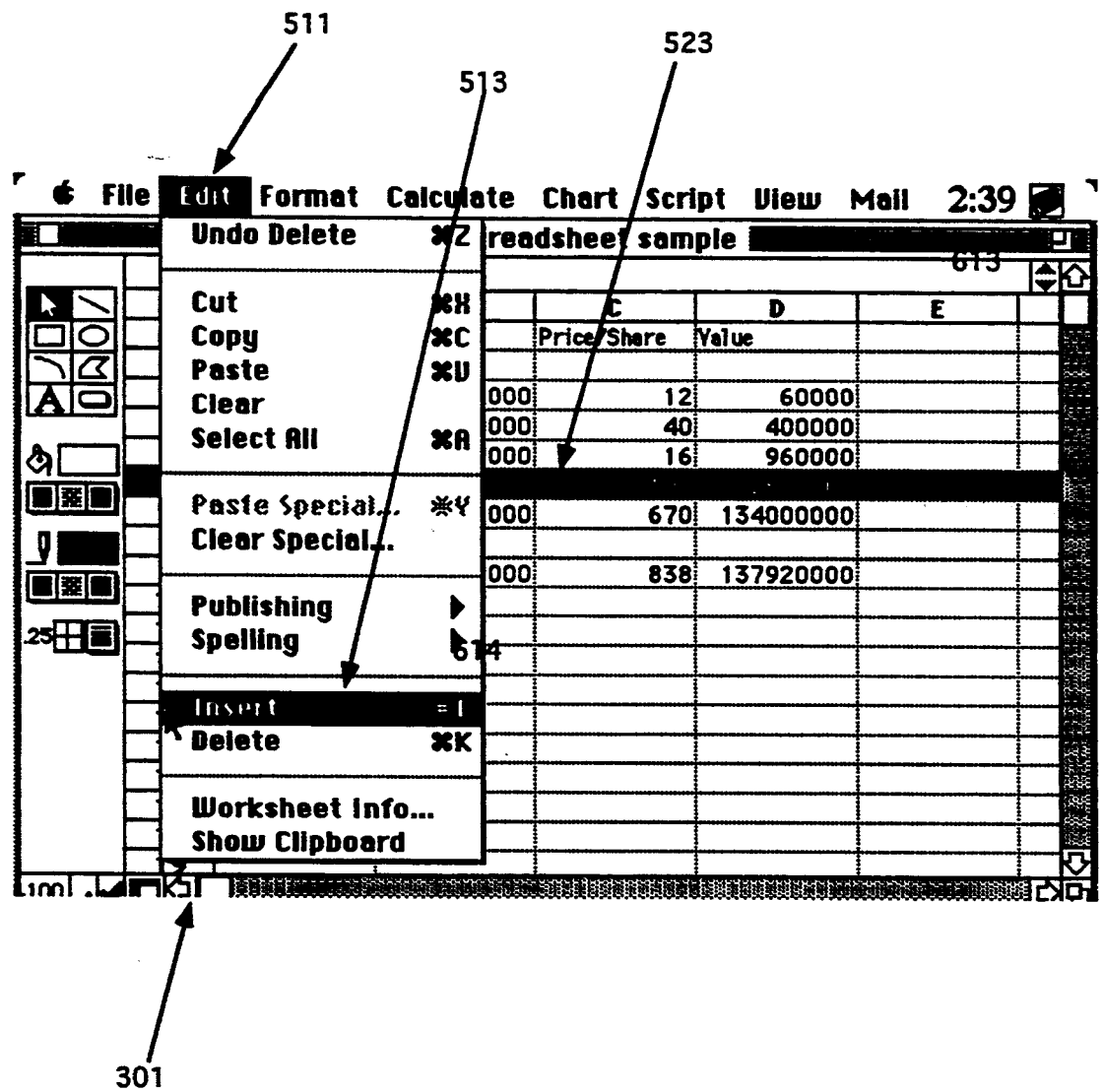
Figure 5D:
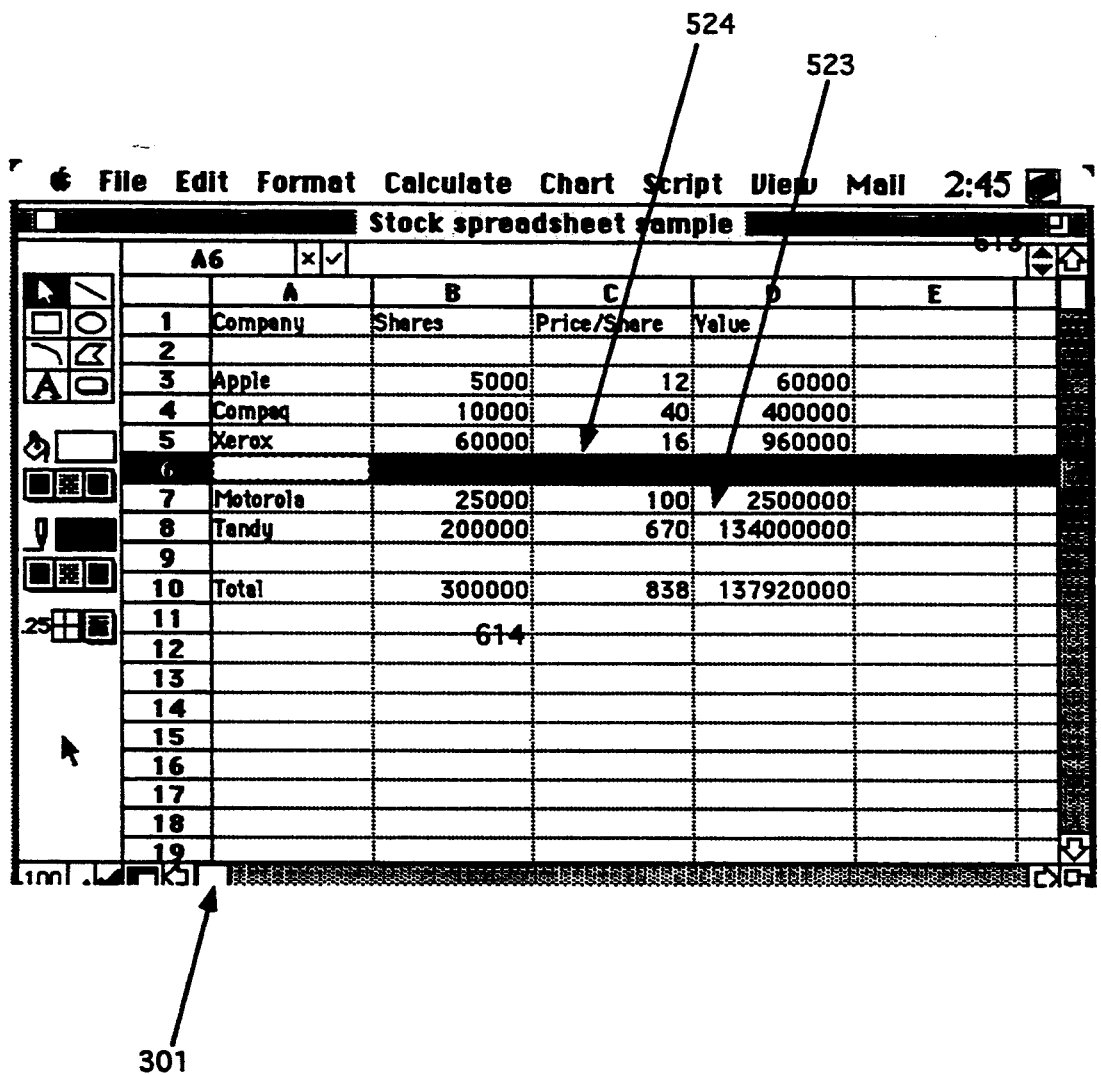

Importantly, the row and column address of information stored in a cell may change due to a variety of operation which may be performed on the spreadsheet. For example, as illustrated by FIG. 5(c), the system of the present invention provides for inserted rows (or columns) in the spreadsheet by first selecting, for example, a row 523 and then selecting the "edit" function 511 which causes display of the "edit" menu. The user then selects the "Insert" function which causes a new row 524 (shown in FIG. 5(d)) to be inserted above row 523. As will be appreciated from a review of the figures, the row addresses of all data in cells in row 524 have been changes as a result of this action from row 6 to row 7 and this has also caused data which was previously in row 7 to have been moved to row 9 with corresponding changes on all rows of data below row 6 in the spreadsheet.

Figure 5E:
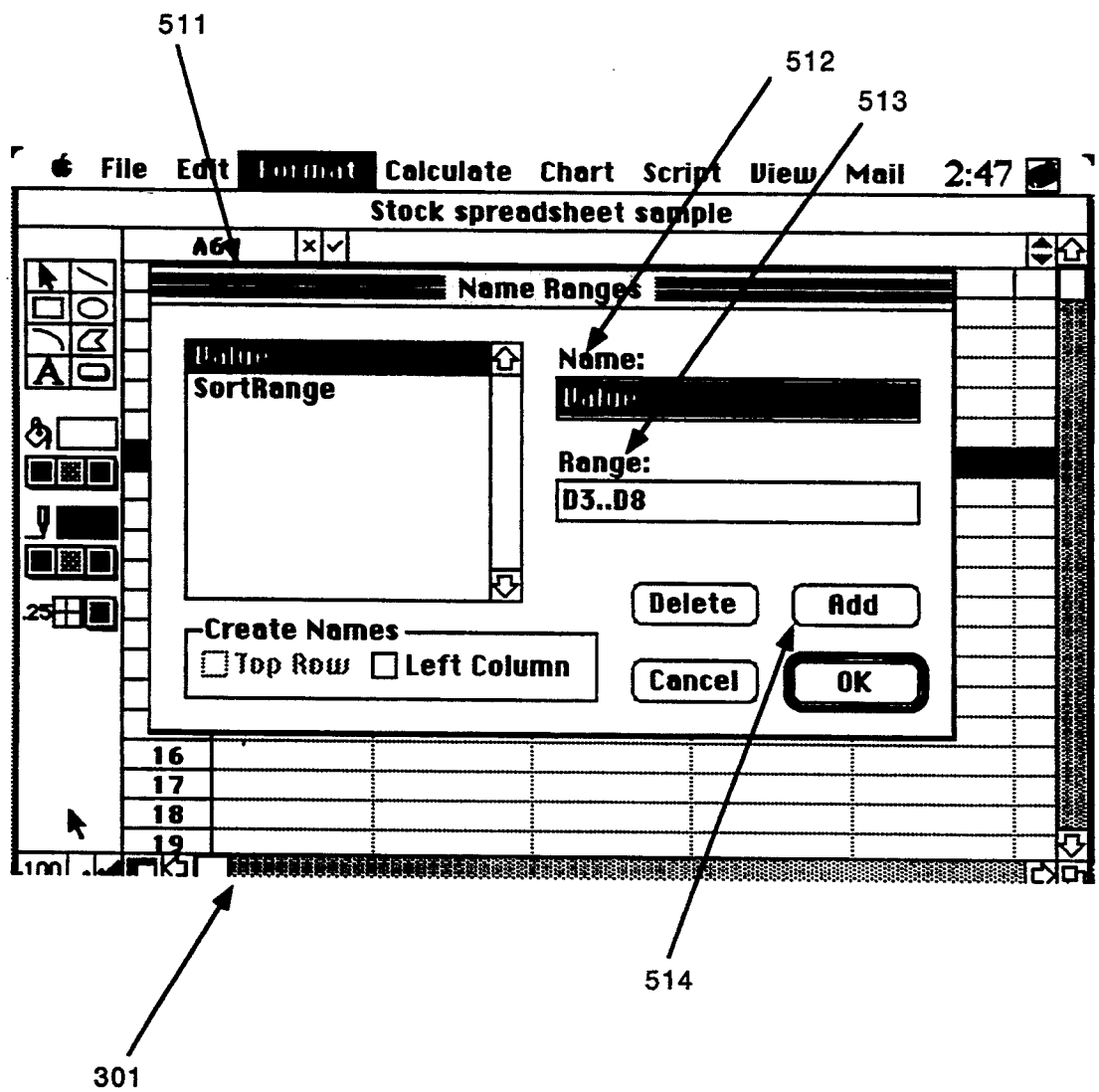
Figure 5F:
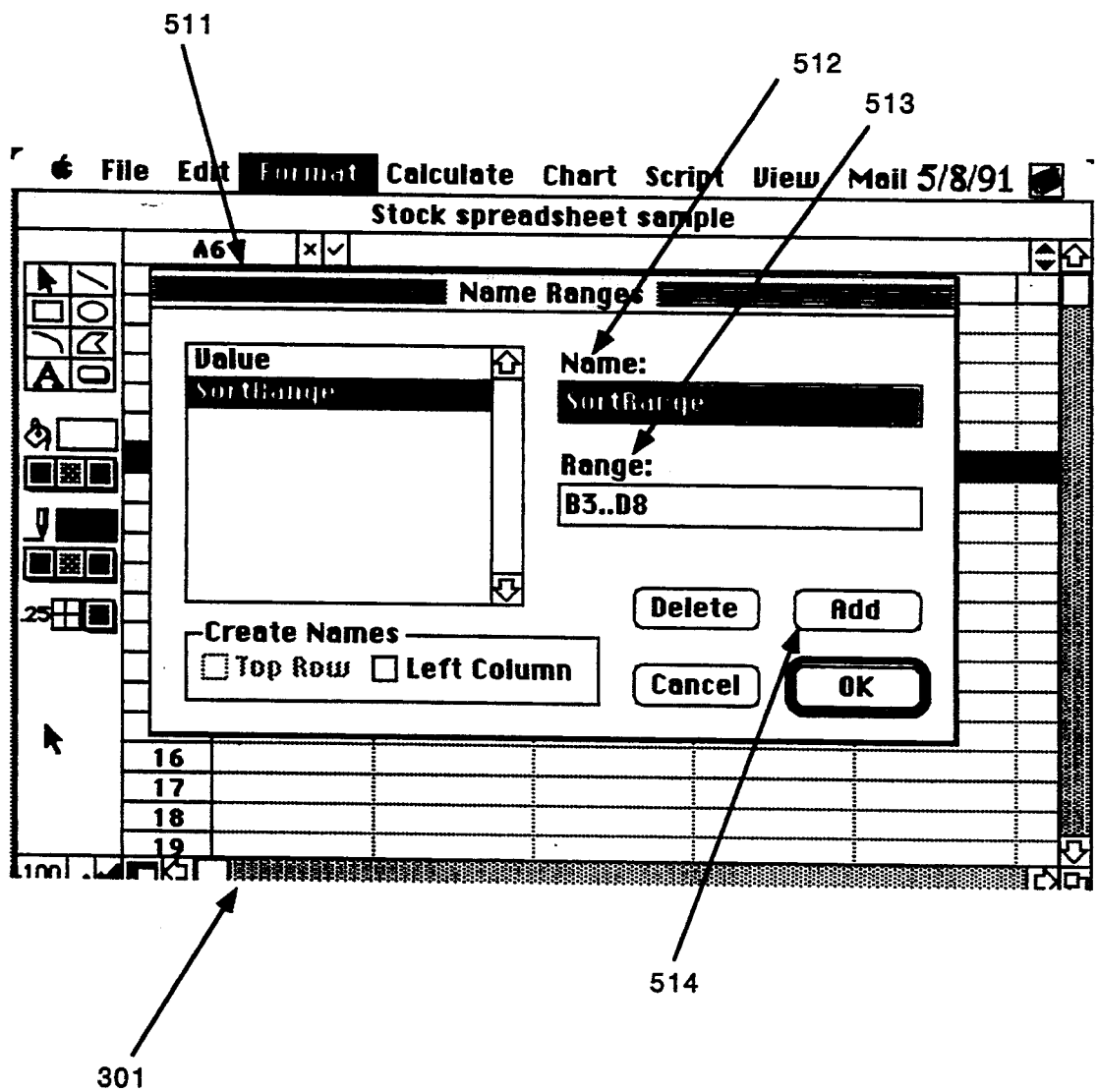

Importantly, and as illustrated by FIG. 5(e), the present invention provides for automatic update of the row/column address information associated with logical names to be updated as a result of changes in the absolute address of cells. FIG. 5(e) illustrates that the range for the logical name value has now been extended to included data in column D from row 3 to row 8.

SORT DATA

The spreadsheet of the present invention provides a sort function which allows for sorting of data in a spreadsheet based on parameters entered by the user. The parameters include sort keys, designation of whether the sort is to be in ascending or descending order, the range of cells to be sorted, and whether the data is to be sorted by rows or by columns. (As stated above, the term "son type" will be used to refer to the selection between sorting by rows or sorting by columns.)

Importantly, it is expected that many users of the system of the present invention will not intuitively know whether they require cells to be sorted by rows or by columns. Therefore, as will be seen, the present invention provides for a graphical indication of the sort type which is thought to advantageously provide the user of the system with an indication of what is meant by "son by rows" or "son by columns".

Figure 6A:
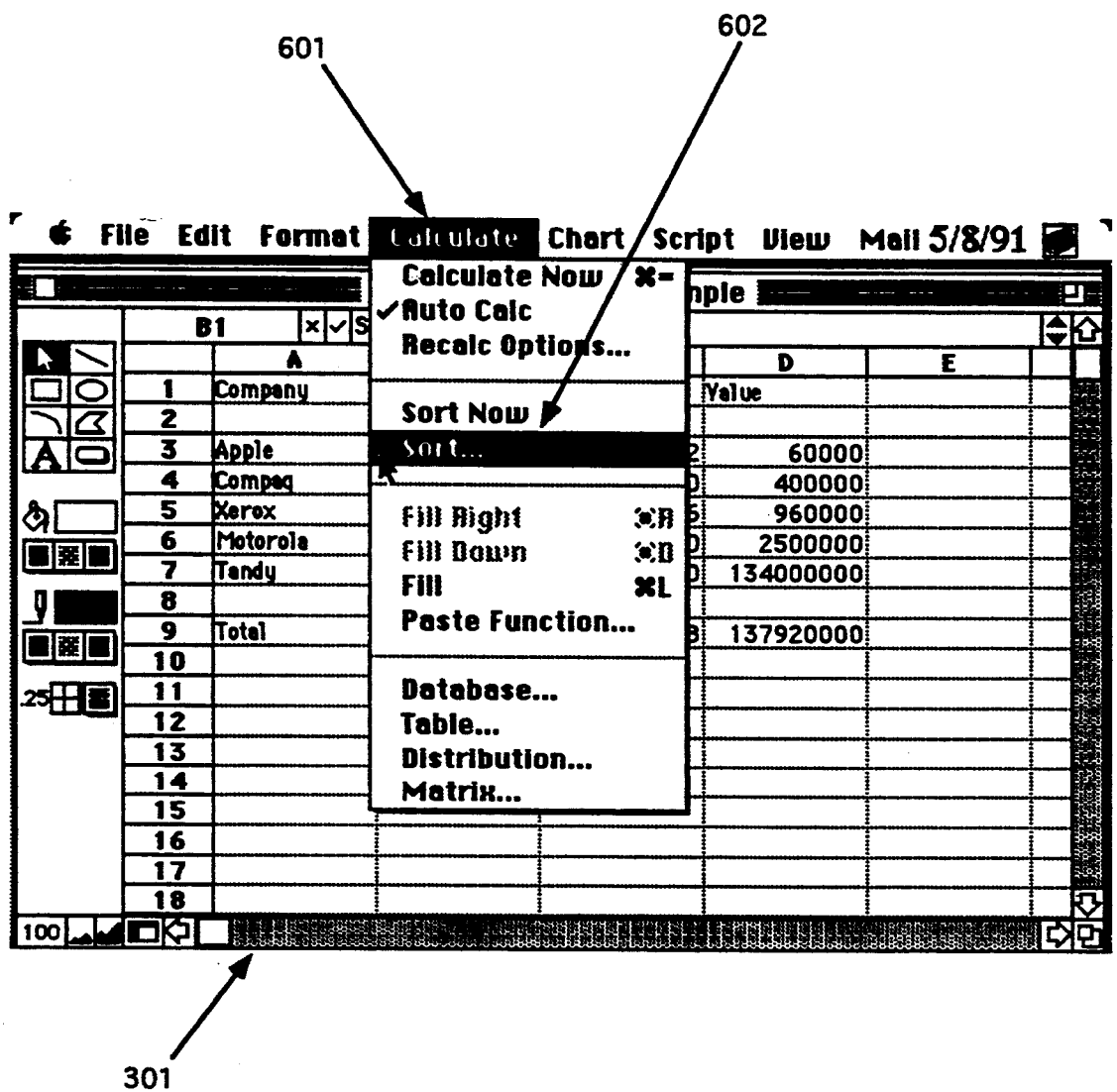
FIG. 6(a) through FIG. 6(c) are illustrations of a display screen showing a process for sorting cells as may be utilized by the system of the preferred embodiment.

FIG. 6(a) is useful to begin a discussion of the sort process. Initially, the user selects the "calculate" function 601 from the menu bar and then selects the "Sort . . . " function 602 from the "calculate" menu. Selection of the "Sort . . . " function 602 causes a dialog box to appear on the display device. The dialog box is shown as dialog box 611 of FIG. 6(b). The dialog box 611 includes a box for entering a range of cells to be sorted 613—the range may be expressed in absolute addresses or it may be expressed as a logical name as discussed above. In the example illustrated by FIG. 6(b) the range is expressed as a range of absolute addresses including rows 3–7 and columns A–D. A review of FIG. 3 will show that this range includes all data entered in the exemplary spreadsheet except for the title information.

Figure 6B:
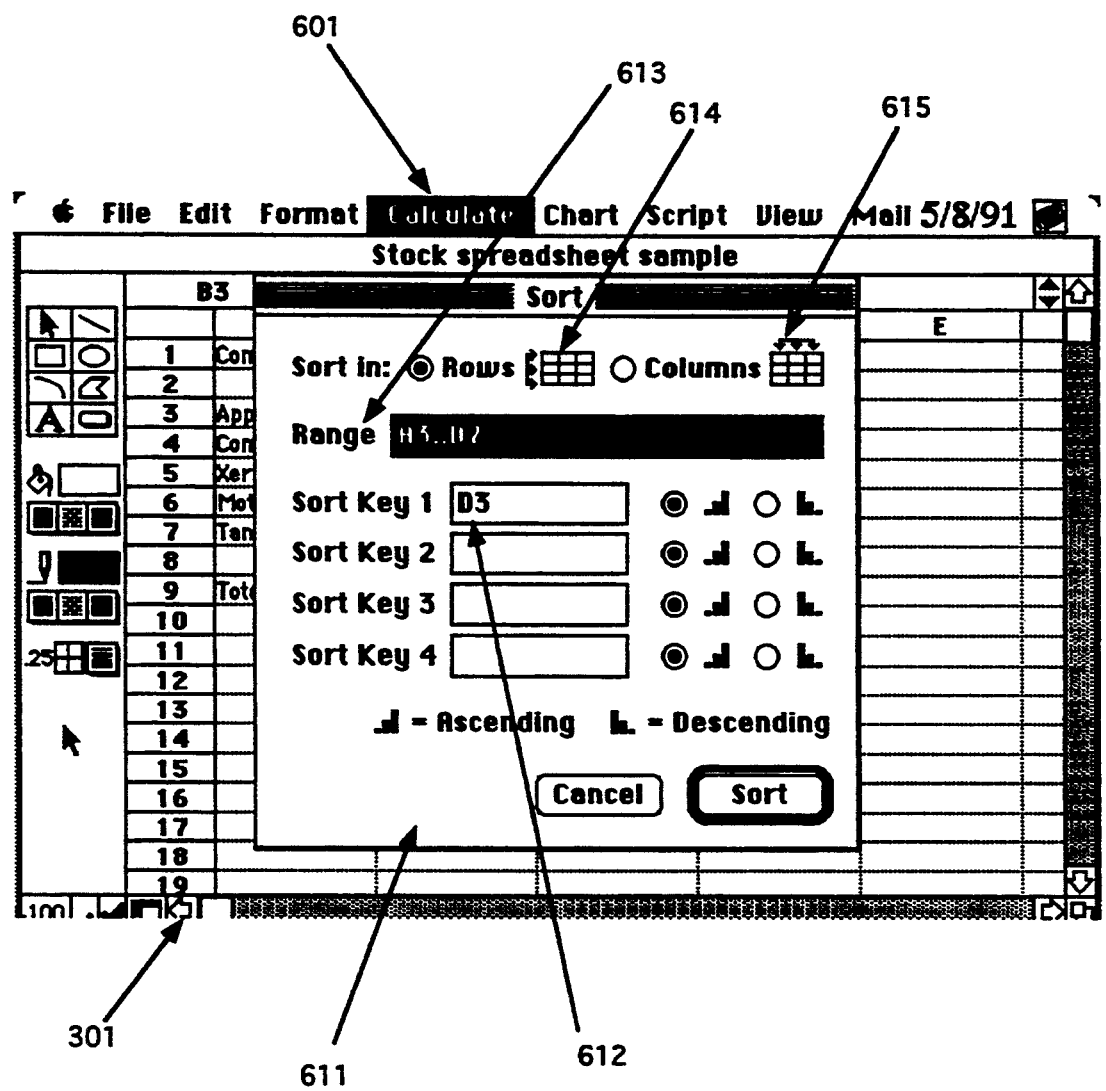

A sort key 612 is also entered. In the example of FIG. 6(b), the sort key is entered as an absolute address, D3, although again it may alternatively be entered as a logical name. The sort key may be thought of as indicating the row or column the data is to be sorted by and, as such, once the range and sort type are known, the computer system only requires the row number (for "sort by column") or column letter (for "sort by column ") to perform the sort. However, in the preferred embodiment data is entered as row/column addresses and the computer system extracts the information that is required. If a range of addresses is entered (or as a logical name which would include a range of addresses), the sort key is assumed to be the first row (in the case of "sort by column ") or first column (in the case of "sort by row") in the range.

The preferred embodiment of the present invention allows for up to four sort keys to be entered (for example, in a spreadsheet including names where both the fast name, last name and middle name are entered, three sort keys may be used where sort key 1 is last name, sort key 2 is first name and sort key 3 is middle initial). For each sort key entered, the sort may be specified as being in ascending or descending order.

Finally, the sort type is specified as being by rows or by columns. The user is allowed to select between these two sort types by clicking on either the button labeled "Rows" or the button labeled "Columns". Importantly, adjacent to the word rows there is a graphical indication 614 in the form of an icon illustrating a grid having rows and columns with indicator coupling the rows of the grid. The graphical indicator 614 of the present invention graphically illustrates to the user the sort type selected when selecting the rows option. Of course, many alternative graphical indicia may be apparent to those of ordinary skill in the art and such alternatives would not represent departures from the spirit and scope of the present invention. For example, an arrow having its tail at one row and pointing with its head to another row may be utilized in place of the indicator of the preferred embodiment Similarly, adjacent to the "Coitus" label, the present invention provides a graphical indication 615, again in the form of an icon illustrating a grid having rows and columns, here with an indicator coupling the columns of the grid. The graphical indication 615 illustrates to the user the sort type selected when selecting the columns option. Similar alternative embodiments may be utilized to the graphical indication 615 as were described for the graphical indication 614.

Of course, other alternative embodiments are also within the scope of the present invention. For example, an alternative system may only display the particular graphical indication after the user has selected the sort type. Or, the system may display a default sort type with an appropriate graphical indication and allow the user to select another sort type—the appropriate graphical indication being displayed responsive to selection of the other sort type.

Figure 6C:
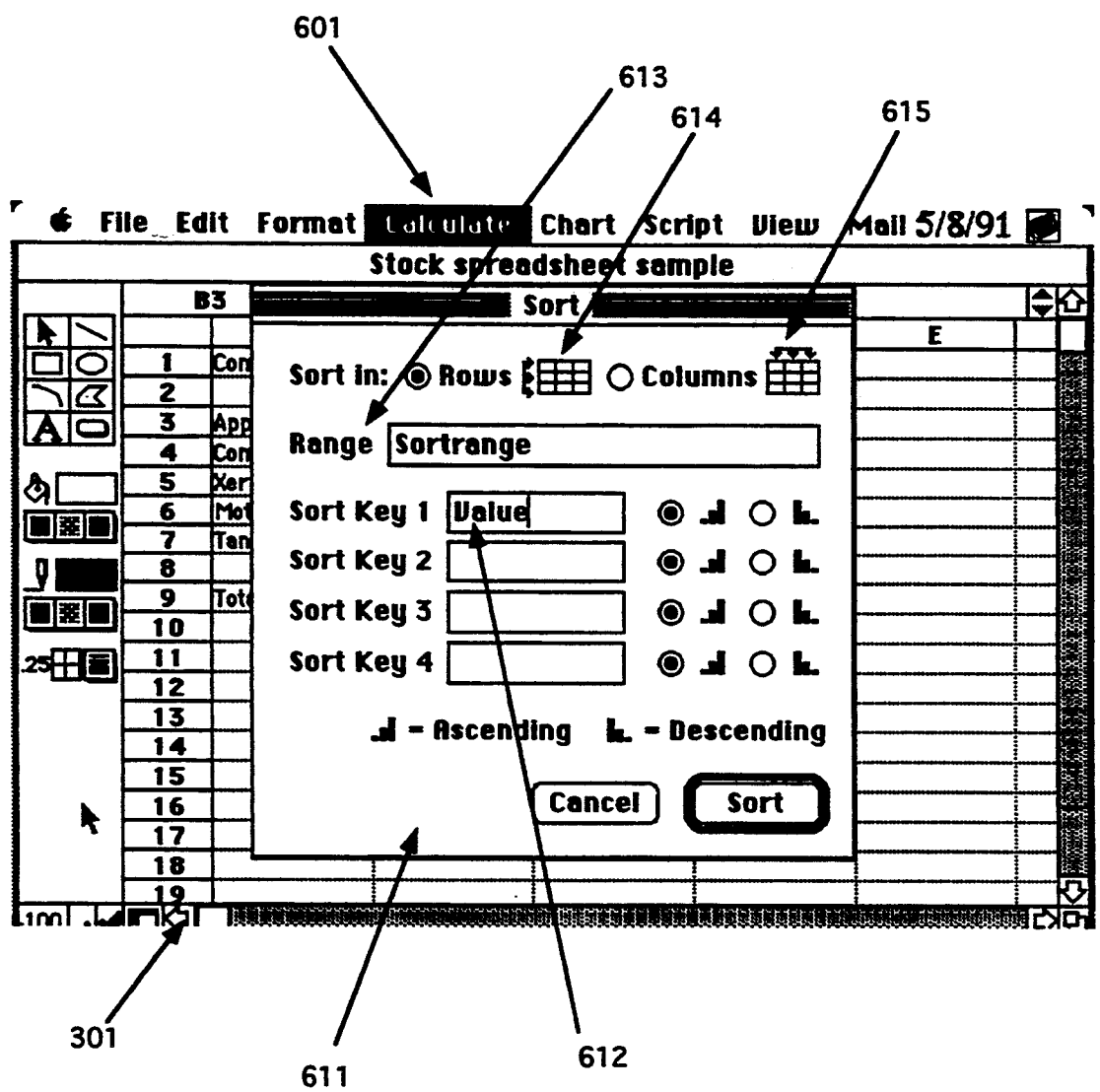

FIG. 6(c) illustrates the dialog box 611 showing use of logical names rather than absolute addressing for the range 613 and sort key 612.

THE SCRIPT FILE

Figure 7A:
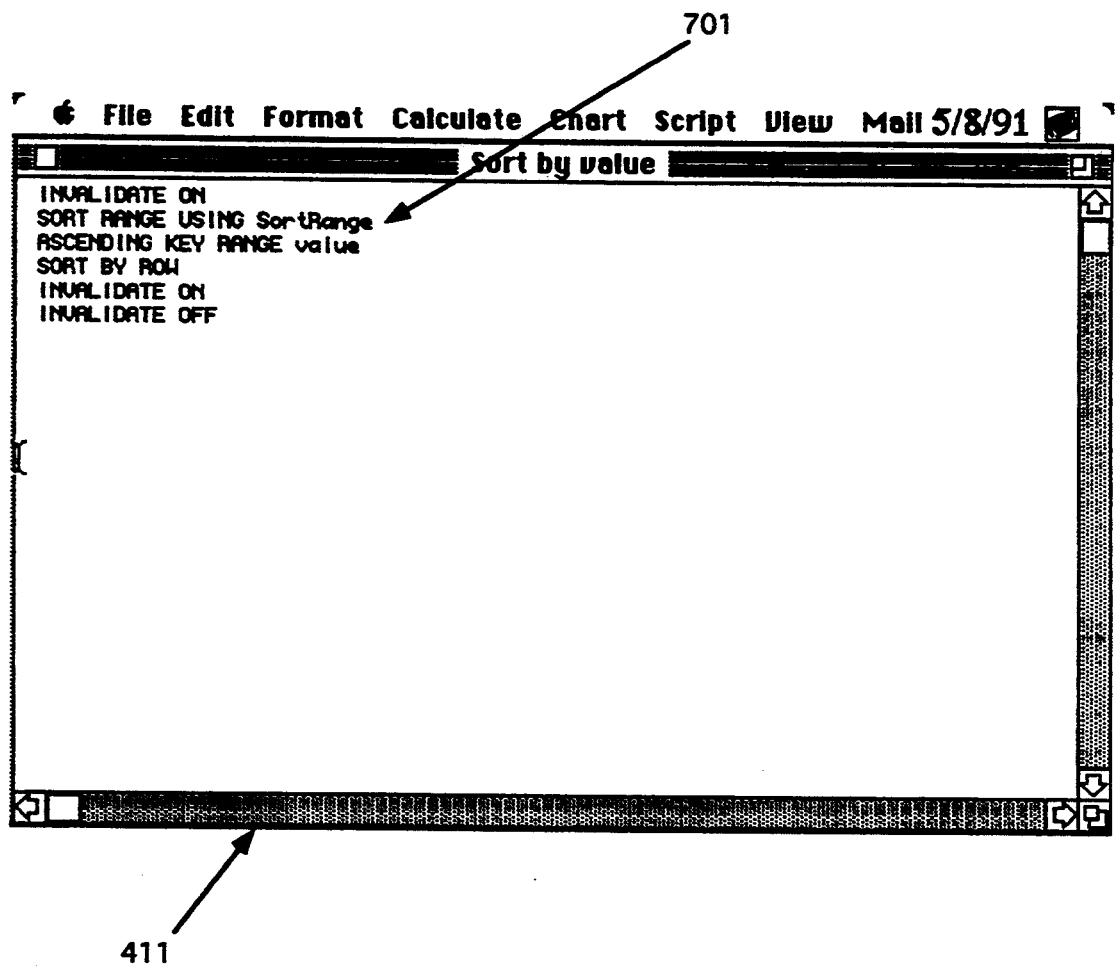
FIG. 7(a) through FIG. 7(b) are illustrations of a display screen showing a script as may be utilized by the system of the preferred embodiment.
Figure 7B:
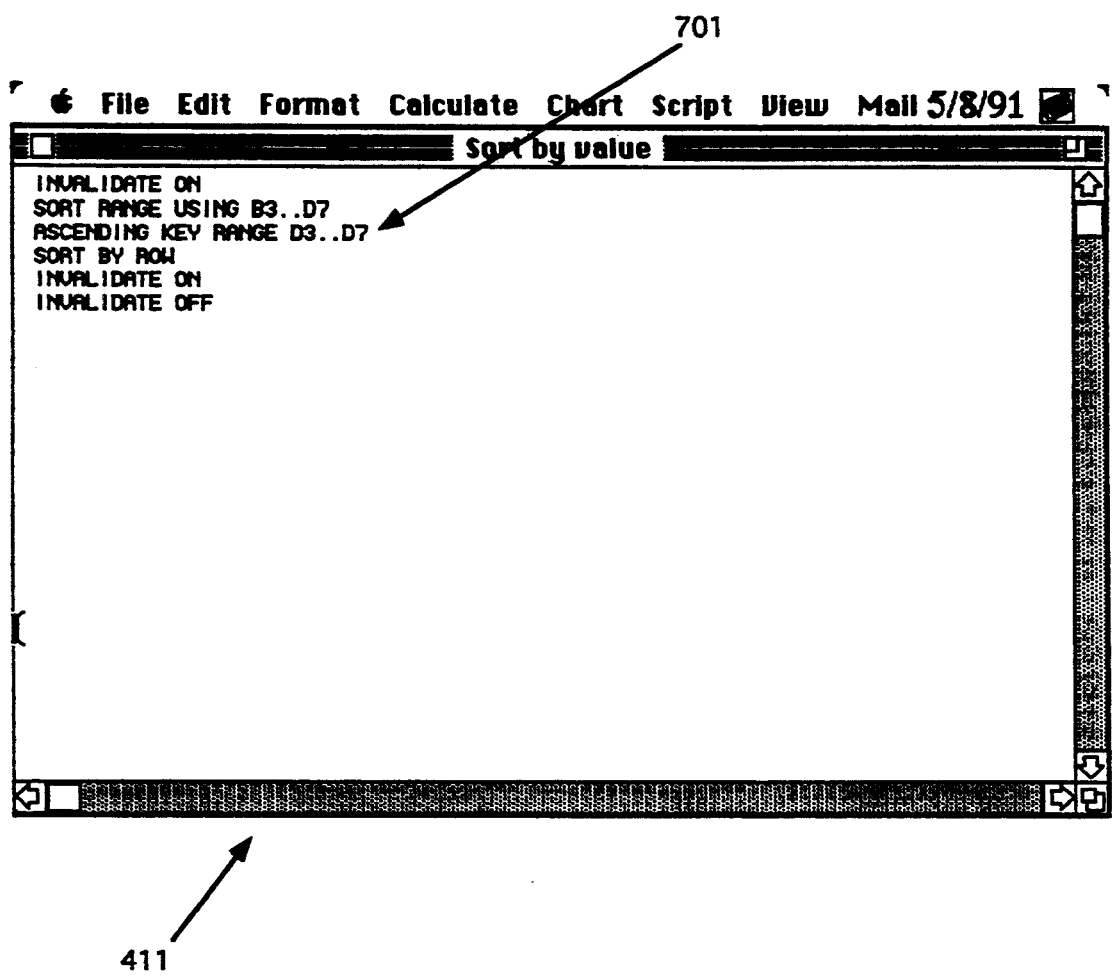

Assume now that the user turns learn mode off after having completed a sort as described above. FIG. 7(a) illustrates the script fie 701 generated by the learn mode for the sort when logical names were used for the range and sort key; FIG. 7(b) illustrates script file 701 generated by the learn mode for the sort when absolute addresses were used for the range and sort key. These script fries may be repeatably executed by the user of the system of the present invention. In the illustrated example, stock prices may change, thus changing the value of the stocks. The user may wish the stocks to be resorted in order of value after entering the new stock prices. However, if the user inserted a new stock into the portfolio or removed a stock from the portfolio, the script 701 illustrated by FIG. 7(b) would no longer function properly because of the use of absolute addresses in the script. Therefore, as another important aspect of the system of the present invention, it is provided that, as illustrated by FIG. 7(a), script fries may utilize logical names as well as absolute addresses for address operands of commands. In this manner, when the absolute addresses are changed the addresses associated with the logical names are updated as discussed above in connection with FIGS. 5(c), 5(d) and 5(e). A command in a script file using logical names as an address operand will determine the current absolute addresses associated with that logical name at the time the script is executed and will therefore provide a correct result even where the absolute addresses have changed since the script was originally written or was last updated.

DISPLAY GRAPHICAL INFORMATION

It is useful in computerized spreadsheets to allow for display of graphical representation of data contained in cells of the spreadsheets. Many known spreadsheets, for example, providing for printing of graphs and charts such as pie charts, line charts, etc. based on data entered in a spreadsheet. Known spreadsheets also provide for the display of graphical representations of the data on the display device. In many such cases, the graphical information is displayed on the entire or substantially the entire display screen thus covering up or obscuring the row/column data (referred to herein as the columnar data) in the cells of the spreadsheet.

As another aspect of the present invention, graphical representations of the columnar data may be displayed on the display device 122. Importantly, in one display mode, the graphical information is displayed without obscuring or covering up the columnar data represented by the graphical information.

Figure 8A:
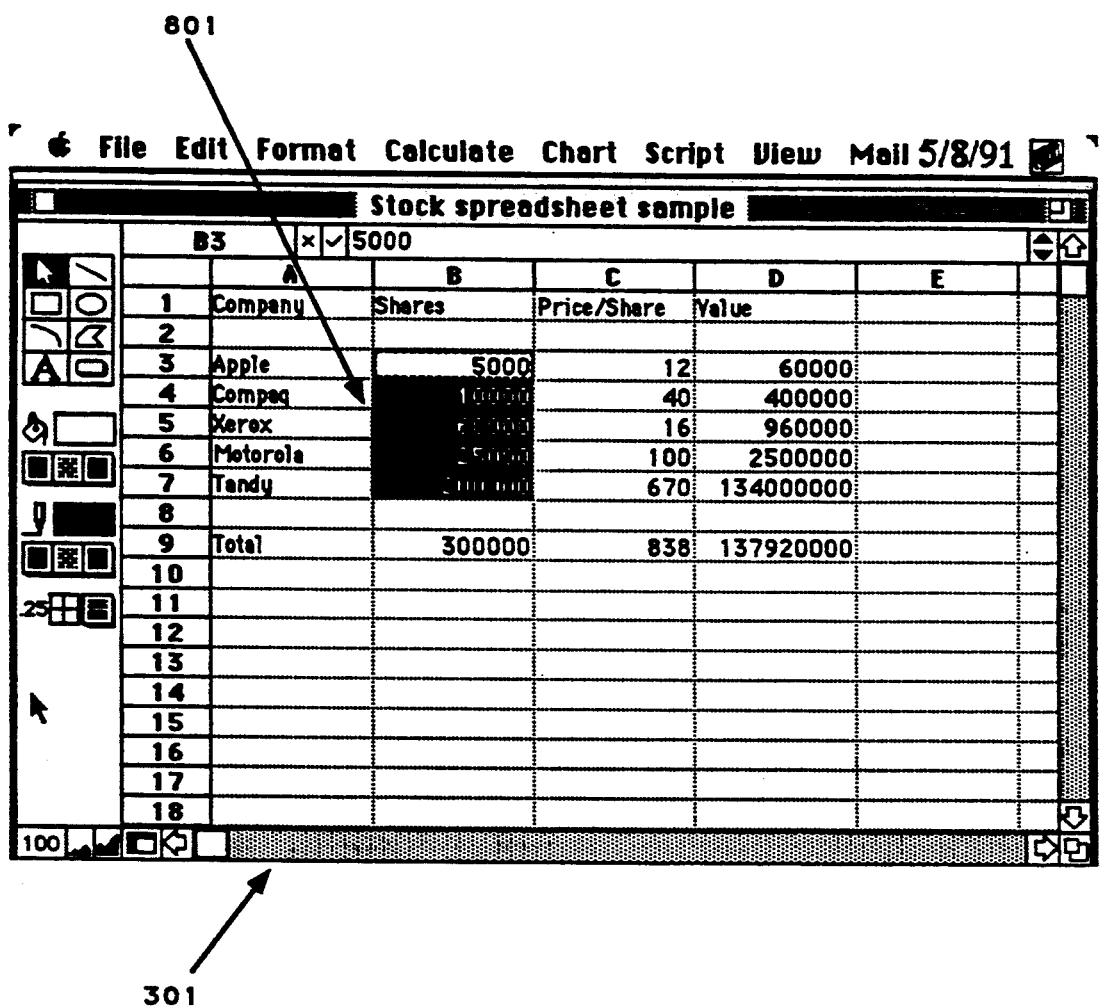
FIG. 8(a) FIG. 8(g) are illustrations of a display screen showing a process for displaying graphical information as may be utilized by the system of the preferred embodiment.

In this mode, the columnar data may be displayed in a first area of the display device 122. This is illustrated by FIG. 8(a) which shows columns A-E and rows 1-18 in a first area of the display screen.

A subset of the columnar data may then be selected from a second area of the display with a selection means, for example by the user pointing to the desired columnar data using a cursor control device 127. Of course, in alternative embodiments the subset may be selected with alternative means. Also, the selected subset of columnar data may preferably comprise from one cell to all cells in the spreadsheet. However, typically, the user will select some logical grouping of cells. This is illustrated by FIG. 8(a) where the number of shares of each of the stocks is selected as the subset 801.

Figure 8B:
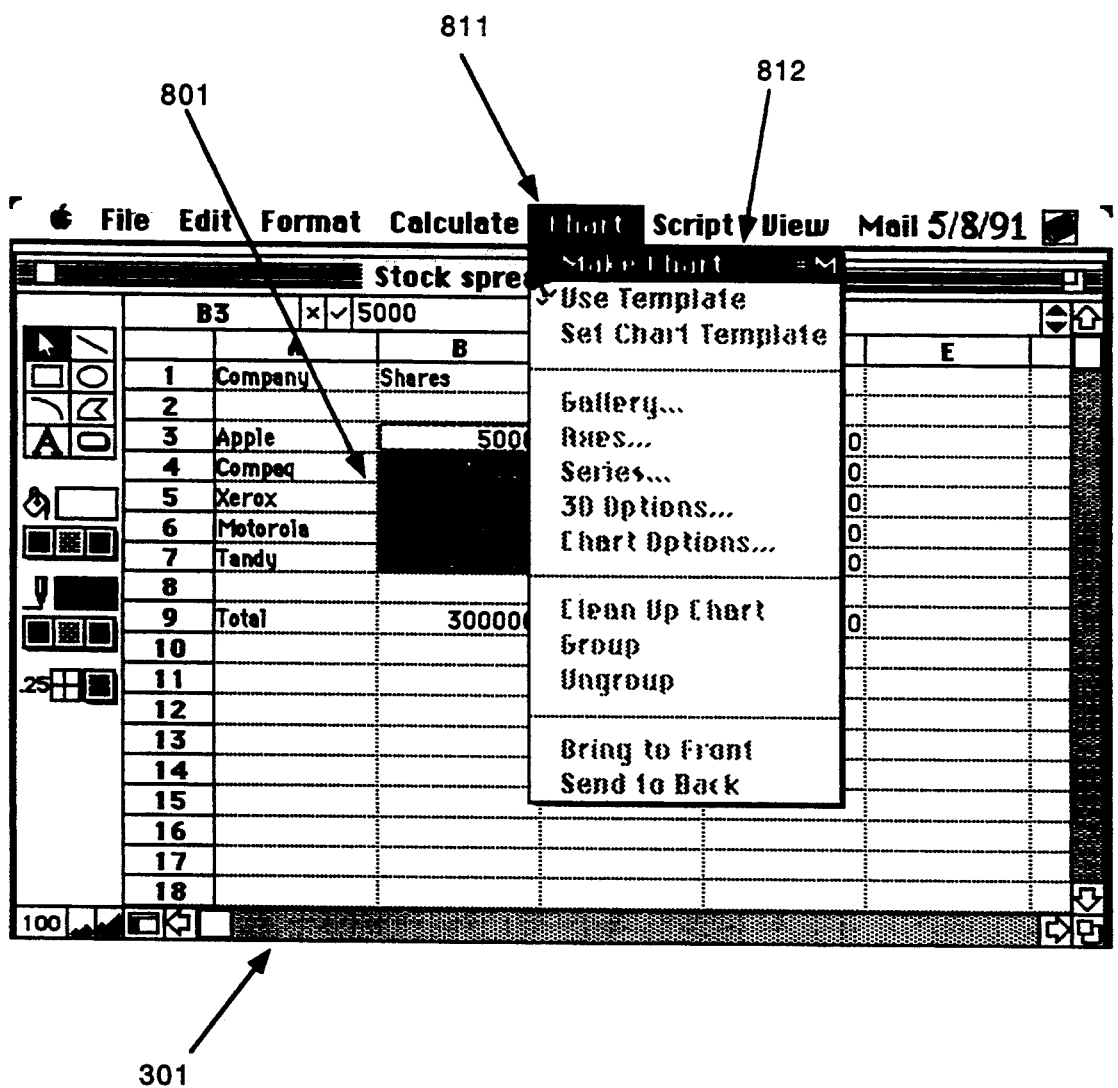

Now, with reference to FIG. 8(b), the user selects the "chart" function 811 from the menu bar and selects the "Make Chart" function 812 from the "Chart" menu. Responsive to selecting the "Make Chart" function, the selected subset of information is processed by a processing means (e.g., processor 102) to provide graphical information to the display device 122 where the graphical information is generated based on the selected subset of columnar data 801. In the preferred embodiment, by default, the graphical information takes the form of a bar chart. However, other forms of graphical information may also be displayed without departure from the spirit and scope of the present invention—for example, the system of the preferred embodiment is capable of generating line charts, pie charts, step charts, layer charts and other specialized charts.

The preferred embodiment provides for display of five types of bar charts: (1) plain (also referred to as vertical), (2) horizontal, (3) stacked, (4) stacked horizontal, and (5) three-dimensional. The preferred embodiment provides for display of three forms of line charts: (1) plain, (2) stacked, and (3) three-dimensional. The are four types of pie charts provided: (1) plain, (2) exploded, (3) three-dimensional, and (4) three-dimensional exploded. There are three types of step charts provided: (1) plain, (2) stacked, and (3) three-dimensional. There are three type of layer charts provided: (1) plain, (2) stacked, and (3) three-dimensional. Finally, the are seven types of specialized charts provided, namely (1) high-low plots, (2) X-Y plots, (3) scatter plots, (4) polar plots, (5) wireframe plots, (6) surface plots, and (7) surface contour plots.

Figure 8C:
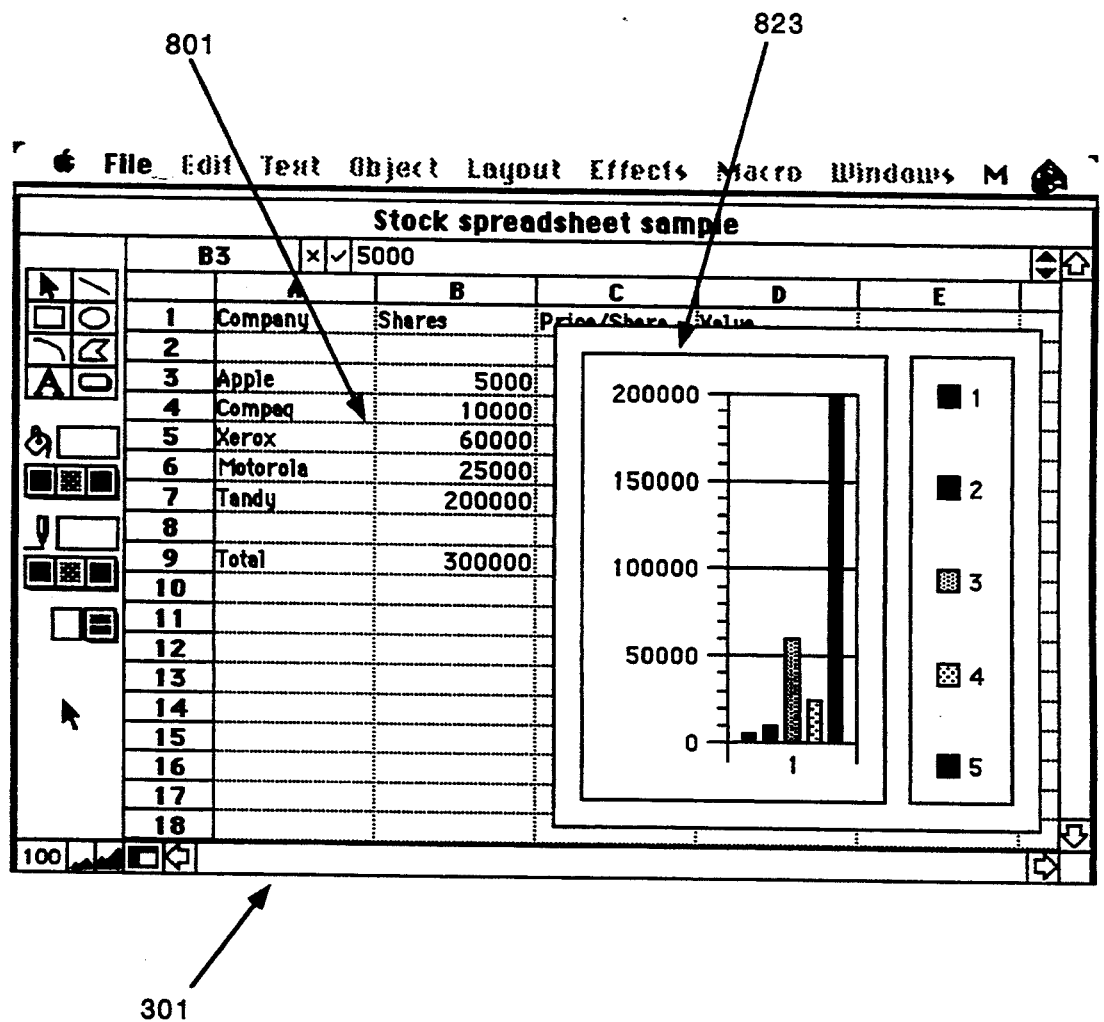

FIG. 8(c) illustrates graphical information 823 in the form of the default bar chart being displayed on the display device 122. As can be seen, the graphical information 823 is displayed in a third area of the display which does not overlap with the second area. As the third area is non-overlapping with the second area, the selected columnar data 801 remains visible to the user of the system simultaneously with the display of the graphical information 823.

Figure 8D:
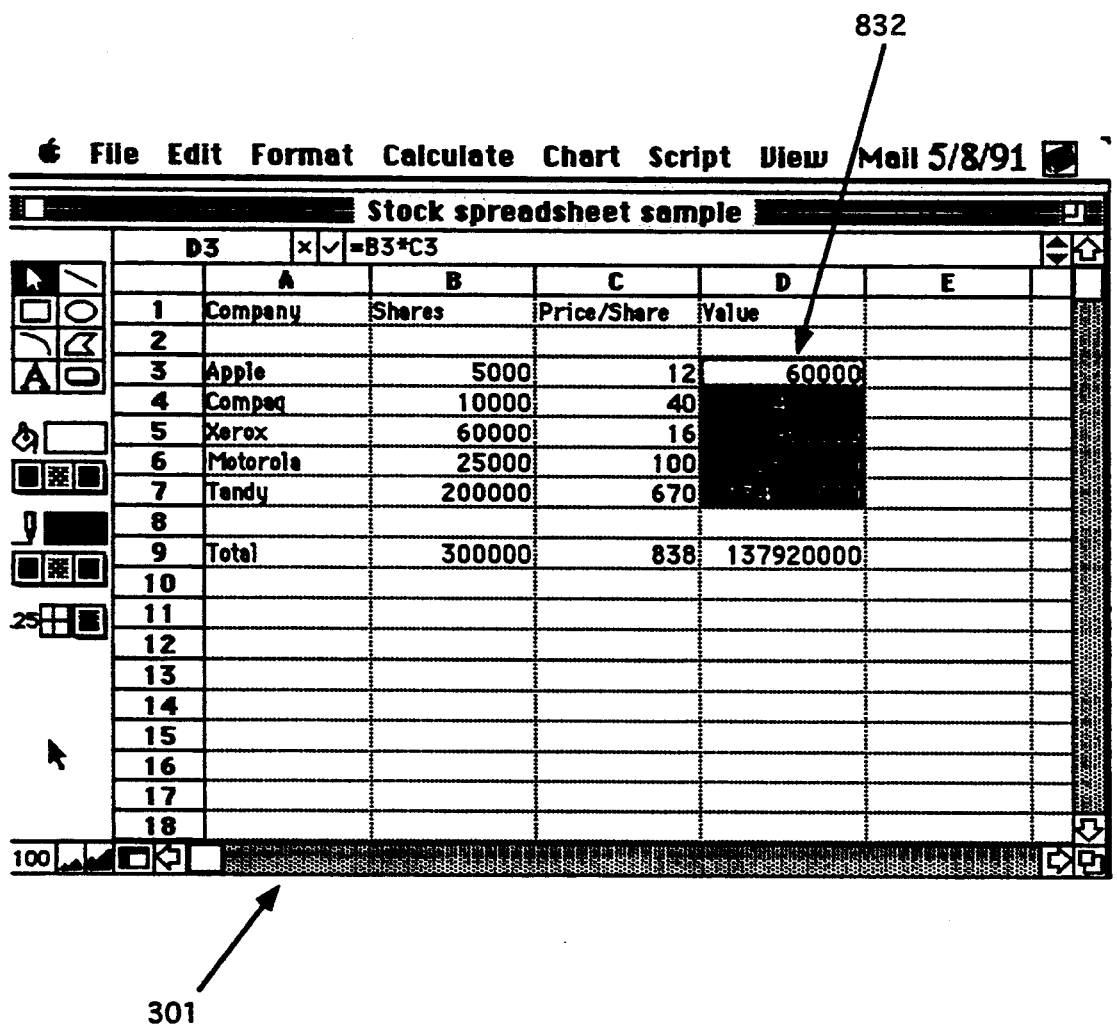
Figure 8E:
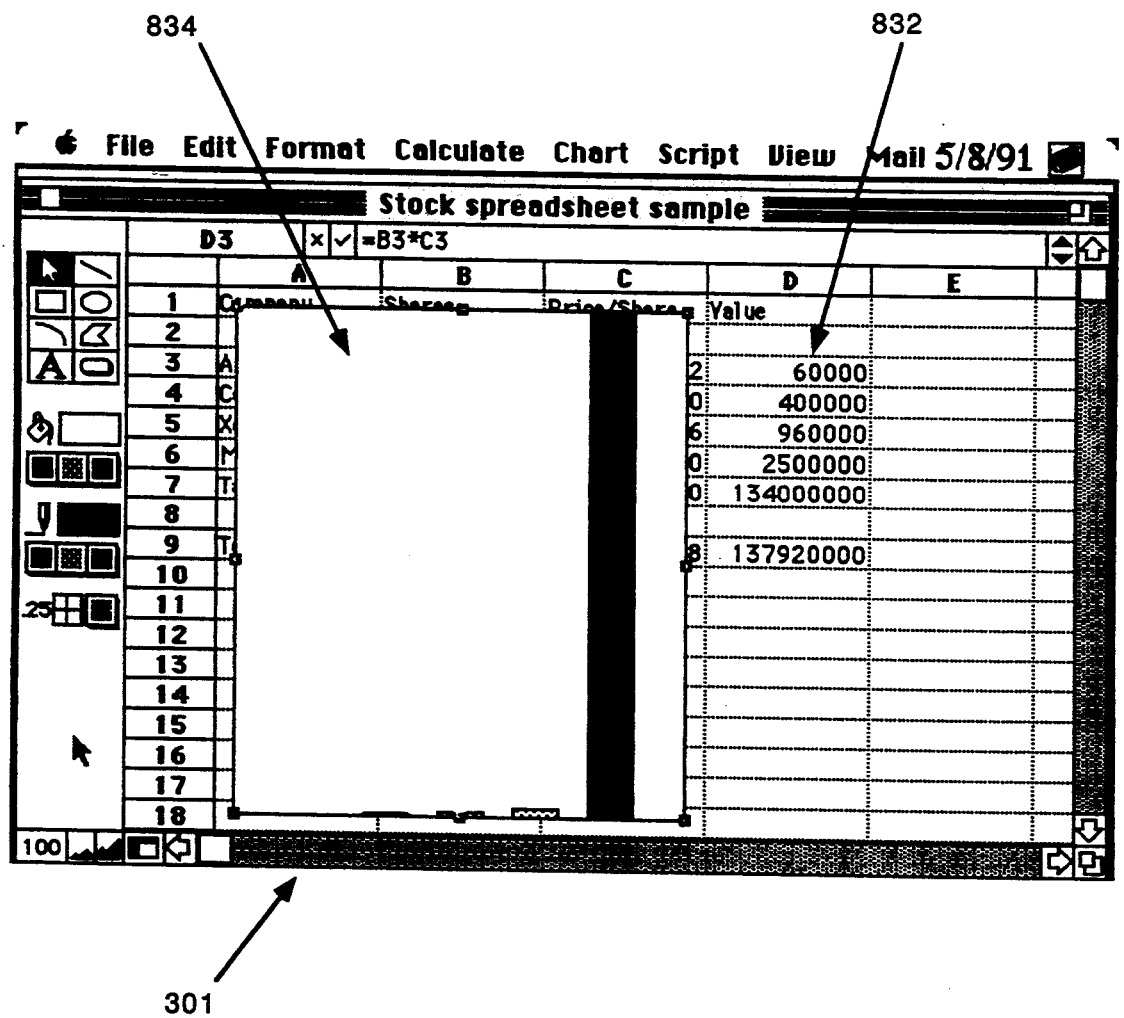

FIG. 8(d) provides further illustration of this aspect of the present invention. As illustrated by FIG. 8(d), the subset of data selected 832 comprises the columnar data representative of the total value of each of the stocks. FIG. 8(e) illustrates a bar chart 834 showing this total value information illustrated graphically on the display at an area which does not overlap or cover up the columnar data 832.

Figure 8F:
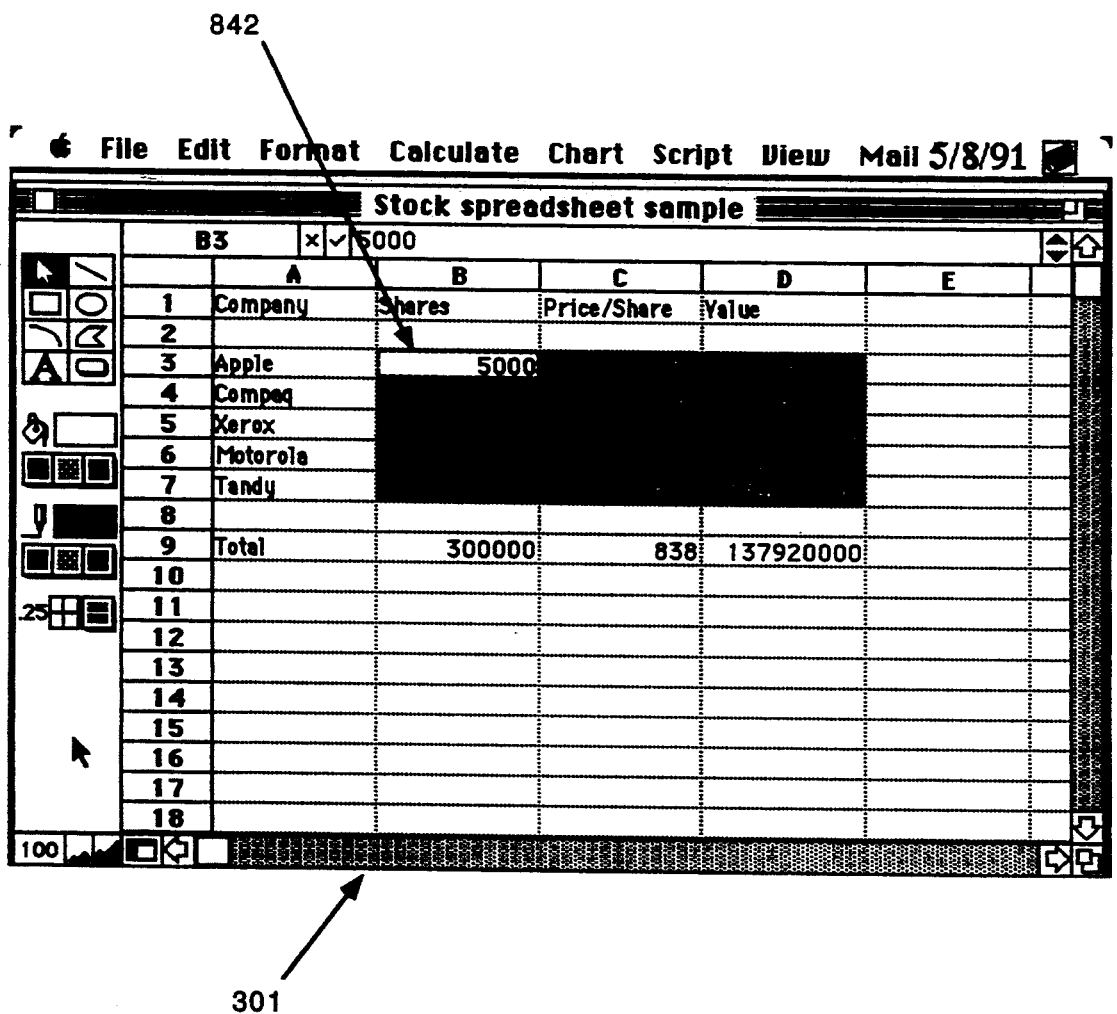
Figure 8G:
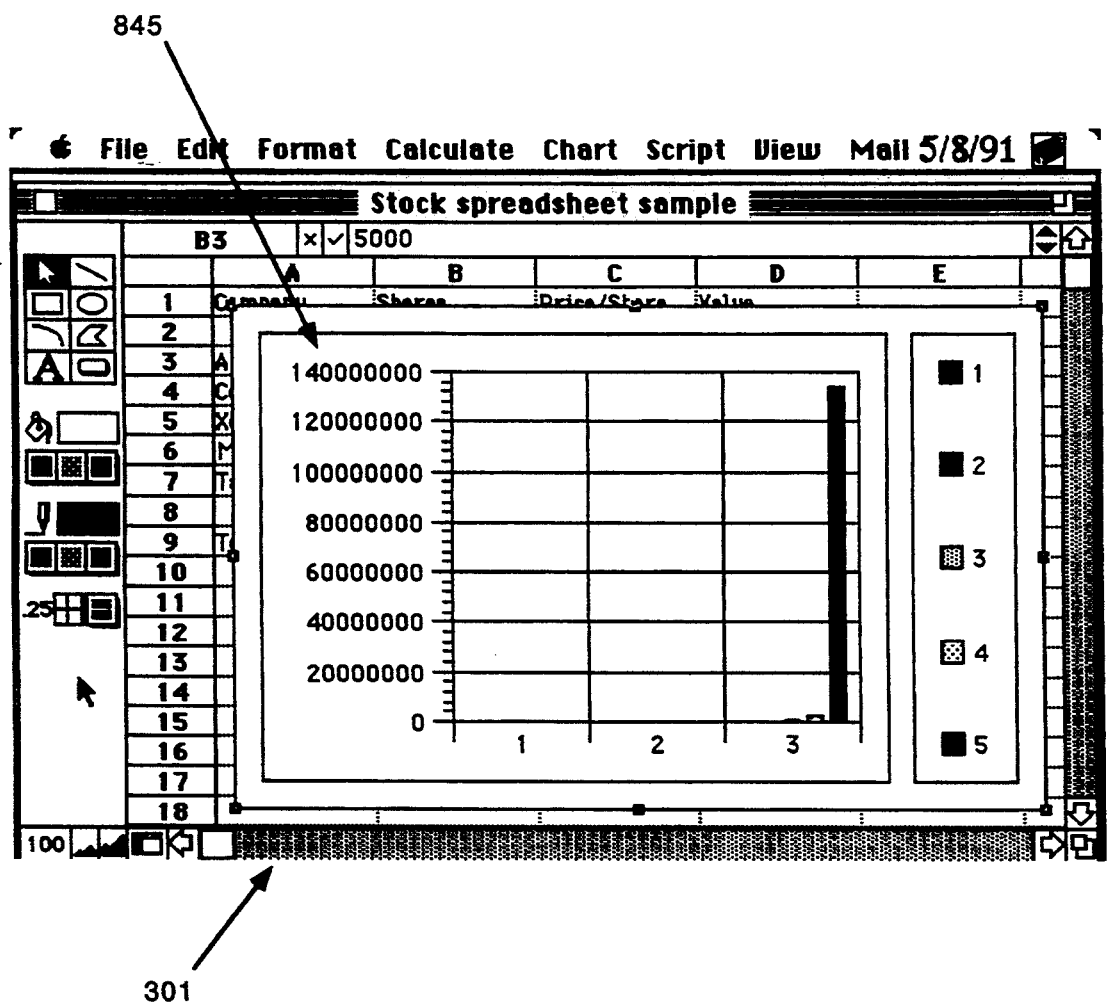

FIG. 8(f) illustrates selection of the number of shares, price per share and value data for each of the five stocks in area 842. As can be appreciated from a review of FIG. 8(f), if the graphical information was displayed so as not to overlap with area 842, it would have to be reduced to such a size that its usefulness would be in question. Therefore, in this case, as shown by FIG. 8(g) the graphical information 845 is displayed to use the entire or substantially the entire first area and, therefore, does result in obscuring of the the columnar data 842. In the preferred embodiment, a minimum chart size is defined as being a rectangle of at least 180 pixels wide and at least 180 pixels high. In the event an area is not available to display the graph which meets the minimum chart size, the graph is displayed in the mode illustrated by FIG. 8(b).

Figure 9:
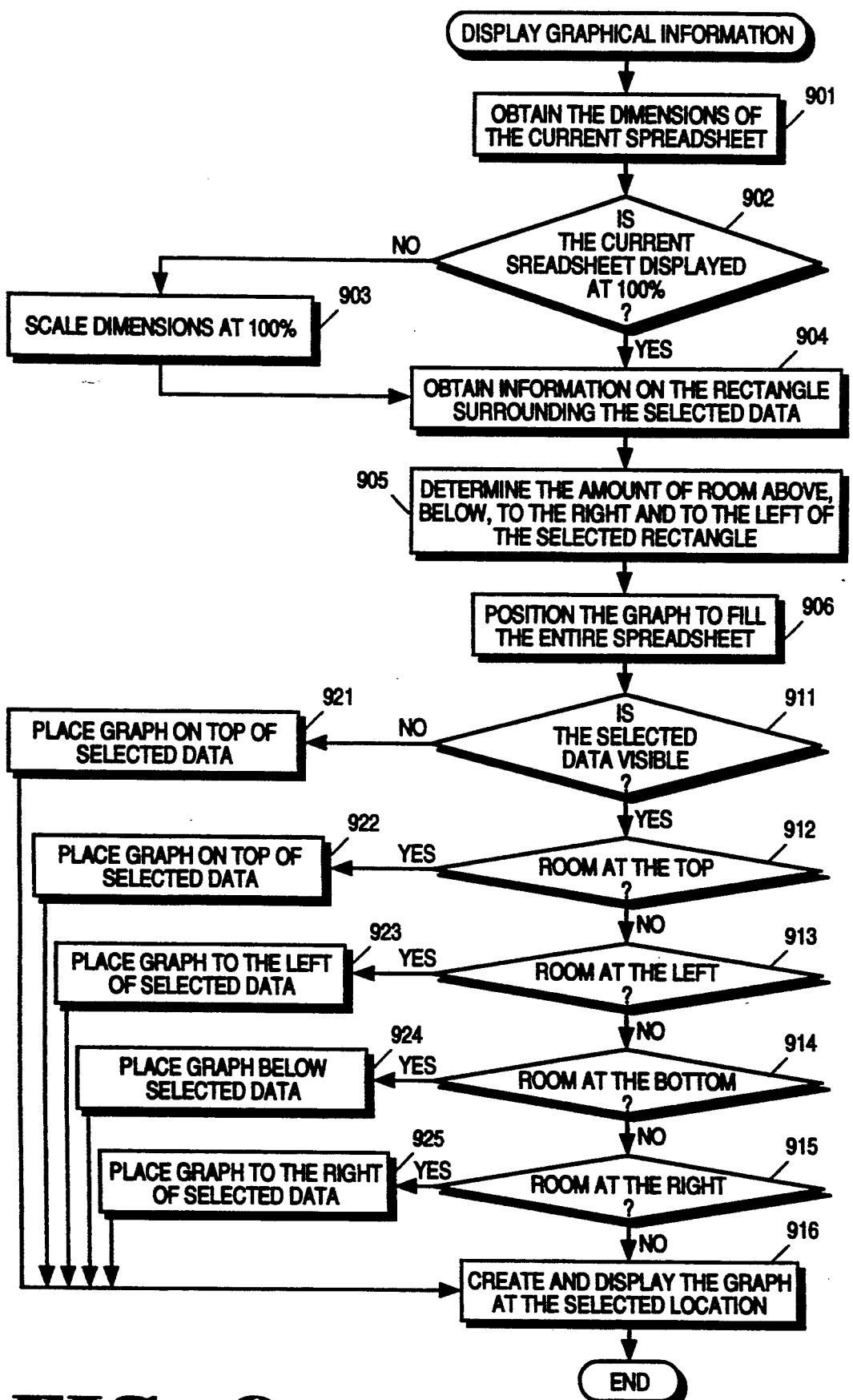
FIG. 9 is a flow diagram illustrating steps for presentation of graphical information on a display as may be utilized by the present invention.

FIG. 9 is a flow diagram illustrating a method as utilized by the preferred embodiment of the present invention to present graphical information on the display. The preferred method involves first obtaining the dimensions, in number of pixels, of the current spreadsheet, i.e., the dimensions of the first area of the display, block 901. Next, a check is made to determine whether the current spreadsheet is displayed at its normal 100% resolution or whether it may have been reduced from that resolution, block 902. In the event the current spreadsheet is not displayed at 100% resolution, its dimensions are scaled by a scale factor so as to provide measurements equivilent to 100%, block 903. This is important because the user may later expand the display back out to 100% and, in that event, a graph which fit according to the rules of the present invention in a reduced spreadsheet may not fit in the expanded spreadsheet.

Next, the position of the rectangle surrounding selected columnar data 801 is determined, block 904. The amount of room (in pixels) in the current spreadsheet above, below, to the right and to the left of the selected columnar data 801 may then be determined, block 906.

By default, the position at which to plot the graph is then set to fill the entire current spreadsheet area, block 906. Unless one of a set of conditions is met (which conditions will be discussed in connection with blocks 912-915), the graph will be generated to cover the entire current spreadsheet area.

It is possible that the selected data is not visible on the display. If that is the case, block 911, the graph will be created to cover the entire spreadsheet area, block 921. This may occur, for example, where a user selected the data and then moved the displayed area to view, but not select, some other columnar data.

Assuming the selected data is visible on the display, a checks are made to determine whether the graph should be displayed at the top of the selected data, below the selected data, to the right of the selected data or to the left of the selected data (block 912-915). In the preferred embodiment, a check is first made to determine if there are at least 180 pixels above the selected data and, if so, if the amount of room above the selected data is greater then the amount of room below and to the right and left of the selected data, block 912. If this test proves true, the graph will be positioned above the selected data, block 922. It should be noted that 180 pixels was selected as a number of pixels which provides a reasonable minimum sized graph—however, in other embodiments some other number of pixels or some other area size may be chosen; in fact, alternate embodiment may choose to make the minimum chart size user selectable.

If the test of block 912 is not met, a check is made to determine whether there is at least 180 pixels to the left of the selected data and if so if the area to the left of the selected data is larger than the area below or to the tight of the selected data, block 913. If the tests of block 913 are met, the graph is positioned to the left of the selected data, block 923.

If the test of block 913 is not met, a check is made to determine whether there is at least 180 pixels below the selected data and if so if the area below the selected data is larger than the area to the right of the selected data, block 914. If the tests of block 914 are met, the graph is positioned to below the selected data, block 924.

Finally, if the tests of block 914 are not met, tests are made to determine if the area to the tight of the selected data is at least 180 pixels wide, block 915, and if so, the graph is positioned to the tight of the selected data.

Now, if none of the tests of blocks 912-915 are met, the graph will be displayed at in its default position, that is, coveting the entire area of the current spreadsheet. In any event, the graph is then created to fit in the selected area and is displayed at the selected location, block 916.

Of course, many alternatives are available to the above description of the preferred embodiment. For example, other methods than the described set of tests 912-15 may be employed to determine the largest available area on the screen for placement of the graph. Alternatively, the order of the tests 912-915 may easily be changed without departure from the teachings of the present invention.

Having said all of the above, it is appreciated that when possible the present invention provides for display of graphical information at a location on the display device so as not to cover up columnar data represented by the graphical information. This offers the user the opportunity to simultaneously review by the graphical information and the columnar data. Thus, an improved computerized spreadsheet has been described.

What is claimed is:

1. A computer implemented method for sorting of information in a computer system comprising the steps of:

(a) said computer displaying said information on a computer controlled displayed device, said information comprising N rows and M columns of data;

(b) said computer displaying a dialog box on said computer controlled display device, said dialog box allowing said computer to accept from a user an indication of a sort type, where said type indicates whether said information is to be sorted by rows or by columns;

(c) said computer displaying on said computer controlled display device a graphical indication of said sort type, wherein said graphical indication comprises, in the case of a sort by rows, a graphical icon illustrating a grid having rows and columns and further having an indicator visually joining at least a first and a second of said rows;

(d) said computer receiving an input from a user to select a sort type; and (e) said computer sorting said information.

2. A computer implemented method for sorting of information in a computer system comprising the steps of:

(a) said computer displaying said information on a computer controlled display device, said information comprising N rows and M columns of data;

(b) said computer displaying a dialog box on said computer controlled display device, said dialog box allowing said computer to accept from a user an indication of a sort type, where said sort type indicates whether said information is to be sorted by rows or by columns;

(c) said computer displaying on said computer controlled display device a graphical indication of said sort type, wherein said graphical indication comprises, in the case of a sort by columns, a graphical icon illustrating a grid having rows and columns and further having an indicator visually joining at least a first and a second of said columns;

(d) said computer receiving an input from a user to select a sort type; and (e) said computer sorting said information.

3. The method as recited by claim 2 further comprising the step of selecting said information as a range of cells.

4. The method as recited by claim 2 further comprising the step of selecting a sort key for performing said sort operation.

5. The method as recited by claim 4 wherein said step of selecting a key may be accomplished by selecting a row in the case of a sort by column and by selecting a column in the case of a sort by row.

6. A computer implemented method for selecting a sort type in a sorting operation on a compute system, where said sort types comprise sorting by rows or sorting by columns, the method comprising the steps of:

(a) said computer displaying information on a computer controlled display device, said information comprising data organized into cells which cells are displayed in rows and columns on a display of said computer system;

(b) said computer displaying a dialog box on said computer controlled display device, said dialog box allowing said computer to accept from a user an indication of a sort type, where said sort type is an indication of whether said information is to be sorted by rows or by columns;

(c) said computer displaying on said computer controlled display device a graphical indication of said sort type, wherein said graphical indication comprises, in the case of a sort by rows, a graphical icon illustrating a grid having rows and columns and further having an indicator visually joining at least a first and a second of said rows; and (d) said computer accepting an input from said user to allow selection of a sort type.

7. The method as recited by claim 6 wherein said graphical indication comprises, in the case of a sort by columns, a graphical icon illustrating a grid having rows and columns and further an indicator visually joining at least a first and a second of said columns.

8. In a computer system having a memory for storing information comprised of a plurality of cells of data a display for displaying said cells of data in a format comprising N rows and M columns, and a processor for sorting said information where said information may be selectively sorted by rows or by columns, an improved method for selecting whether said information is to be sorted by rows or by columns comprising the steps of:

(a) displaying on a compute controlled display device a prompt to prompt a user to select whether said data is to be sorted by rows or by columns;

(b) said said computer accepting an input to from said user to allow selection of a sort by rows or by columns; and (c) displaying on said computer controlled display device a graphical representation indicative of whether the user has selected to sort by rows or by columns, wherein said graphical representation comprise, in the case of a sort by rows, a graphical indicator having a grid and an indicator means coupling a first row of said grid with a second row of said grid.

9. The method as recited by claim 8 wherein said graphical representation comprises, in the case of a sort by columns, a graphical indicator having a grid and an indicator means coupling a first column of said grid with a second column of said grid.

10. In a computer system having a memory for storing information comprised of a plurality of cells of data, a display for displaying said cells of data in a format comprising N rows and M columns, and a processor for sorting said information where said information may be selectively sorted by rows or by columns, an improved method for selecting whether said information is to be sorted by rows or by columns comprising the steps of:

(a) said computer displaying a prompt allowing a user to select whether said data is to be sorted by rows or by columns;

(b) said computer allowing a user to input to said computer an indication of whether to sort by rows or by columns; and (c) said computer displaying representation illustrating graphically sorting by rows or by columns, wherein said representation comprises a first graphical icon illustrating a grid having rows and columns and further having an arrow with its tail at a first row and its head at a second row and a second graphical icon illustrating a grid having rows and columns and further having an indicator visually joining at least a first and a second of said columns.

11. A computer system comprising:

(a) data storage means for storing a plurality of cells of data, said data organized into N rows of cells by M columns of cells;

(b) processing means for sorting said plurality of cells; and (c) display means for displaying a graphical indication of a sort type, where said sort type indicates whether said plurality of cells are to be sorted by rows or by columns, wherein said graphical indication comprises, in the case of a sort by rows, a graphical indicator having a grid and an indicator means coupling a first row of said grid with a second row of said grid.

12. The method as recited by Claim 11 wherein said graphical indication comprises, in the case of a sort by columns, a graphical indicator having a grid and an indicator means coupling a first column of said grid with a second column of said grid.

* * * * *